(12) United States Patent
Kieu et al.

(10) Patent No.: US 6,181,382 B1
(45) Date of Patent: Jan. 30, 2001

(54) HDTV UP CONVERTER

(75) Inventors: Cong Toai Kieu, Ville St-Laurent; Chon Tam Le Dinh, Brossard; Daniel Poirier, Vaudreuil-Dorion, all of (CA)

(73) Assignee: Miranda Technologies Inc., Ville St-Laurent (CA)

( * ) Notice: Under 35 U.S.C. 154(b), the term of this patent shall be extended for 0 days.

(21) Appl. No.: 09/089,472

(22) Filed: Jun. 2, 1998

Related U.S. Application Data

(63) Continuation of application No. PCT/CA98/00304, filed on Apr. 3, 1998, now abandoned.

(51) Int. Cl.⁷ .............................. H04N 7/01; H04N 11/20
(52) U.S. Cl. ........................... 348/459; 348/452; 348/443
(58) Field of Search ...................................... 348/441, 443, 348/444, 447, 448, 456, 458, 459, 451, 452, 450, 449, 446; H04N 7/01, 11/20

(56) References Cited

U.S. PATENT DOCUMENTS

| | | |
|---|---|---|
| 4,636,857 | 1/1987 | Achiha et al. . |
| 4,677,483 | 6/1987 | Dischert et al. . |
| 4,989,090 | 1/1991 | Campbell et al. . |
| 5,001,563 | 3/1991 | Doyle et al. . |
| 5,734,435 * | 3/1998 | Wilson et al. .......................... 348/459 |
| 5,907,364 * | 5/1999 | Furuhata et al. ....................... 348/459 |
| 5,936,676 * | 8/1999 | Ledinh et al. .......................... 348/452 |

FOREIGN PATENT DOCUMENTS

| | | |
|---|---|---|
| 2213606 | 3/1998 | (CA) . |
| 0 637 889 | 2/1995 | (EP) . |
| 0 710 018 | 5/1996 | (EP) . |
| 2197152A | 5/1988 | (GB) . |
| 2 197 152 | 5/1998 | (GB) . |
| WO 95/21505 | 8/1995 | (WO) . |

\* cited by examiner

*Primary Examiner*—Michael Lee

(57) ABSTRACT

An electronic apparatus for converting a standard video signal having 59.94 fields per second into an HDTV video signal having 60.00 fields per second, by adding a number of video fields into each sequence of 1000 video fields. The apparatus detects the best moment for adding the new video field, so that the human eye does not perceive an abrupt change in the video image, by detecting the best motion conditions which occurs either when the image motion is high or very low. For adding the new video field, the apparatus uses an interpolation technique for creating two interpolated video fields which are inserted in place of one existing video field which is deleted. The apparatus also comprises a de-interlacer module for deinterlacing the 60 Hz video image, by using an advanced interpolation technique for calculating the missing video lines. The proposed technique involves directional interpolations of the missing lines pixels in various directions and selection of the best interpolation direction for the creation of each pixel of the missing video lines. The corresponding de-interlacer apparatus comprises a novel edge direction detector which performs the mentionned interpolations in all interpolating directions and then selects the best direction for performing the interpolation for each interpolated pixel, based on the quality of the performed interpolations.

31 Claims, 28 Drawing Sheets

FIG - 4

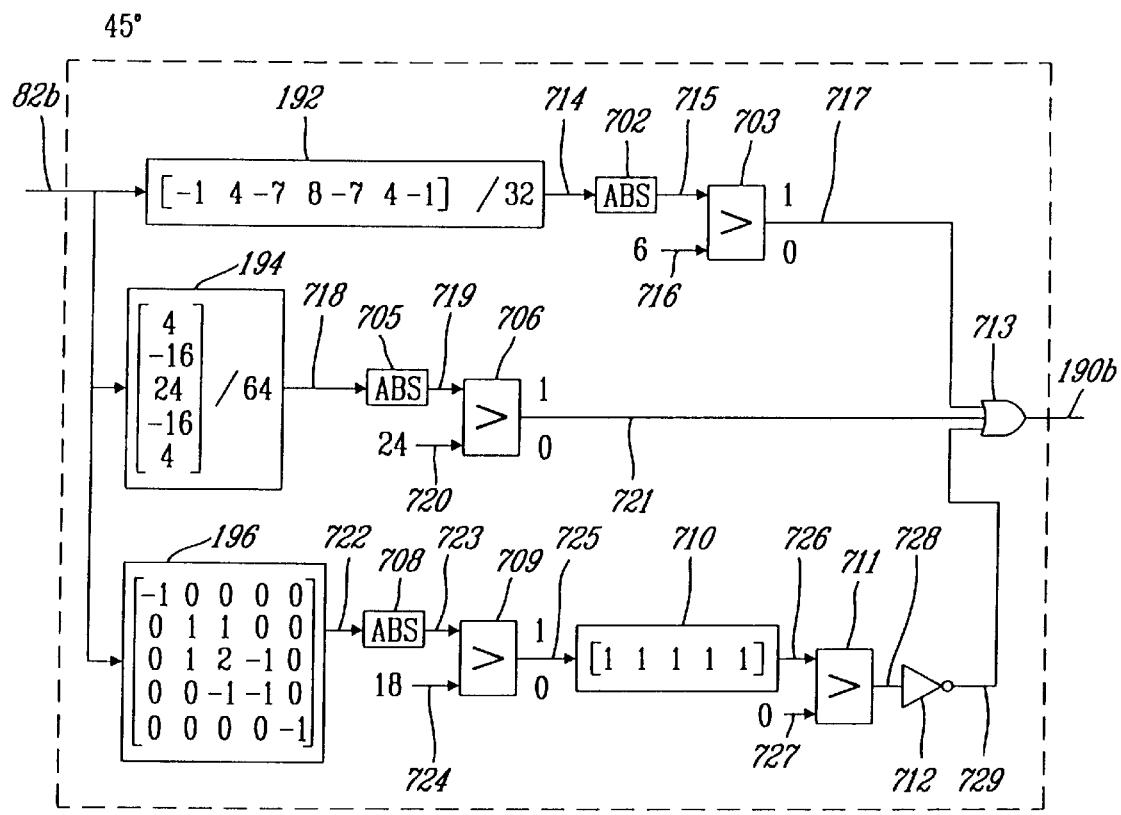
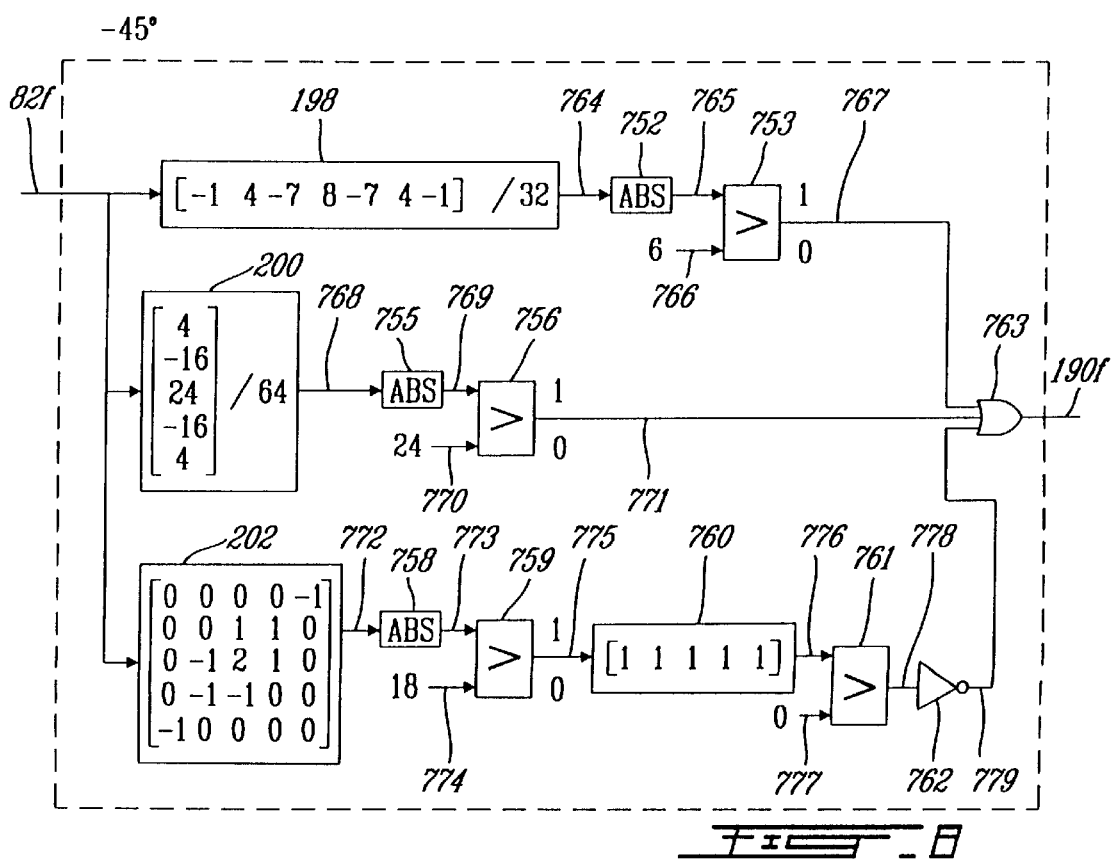

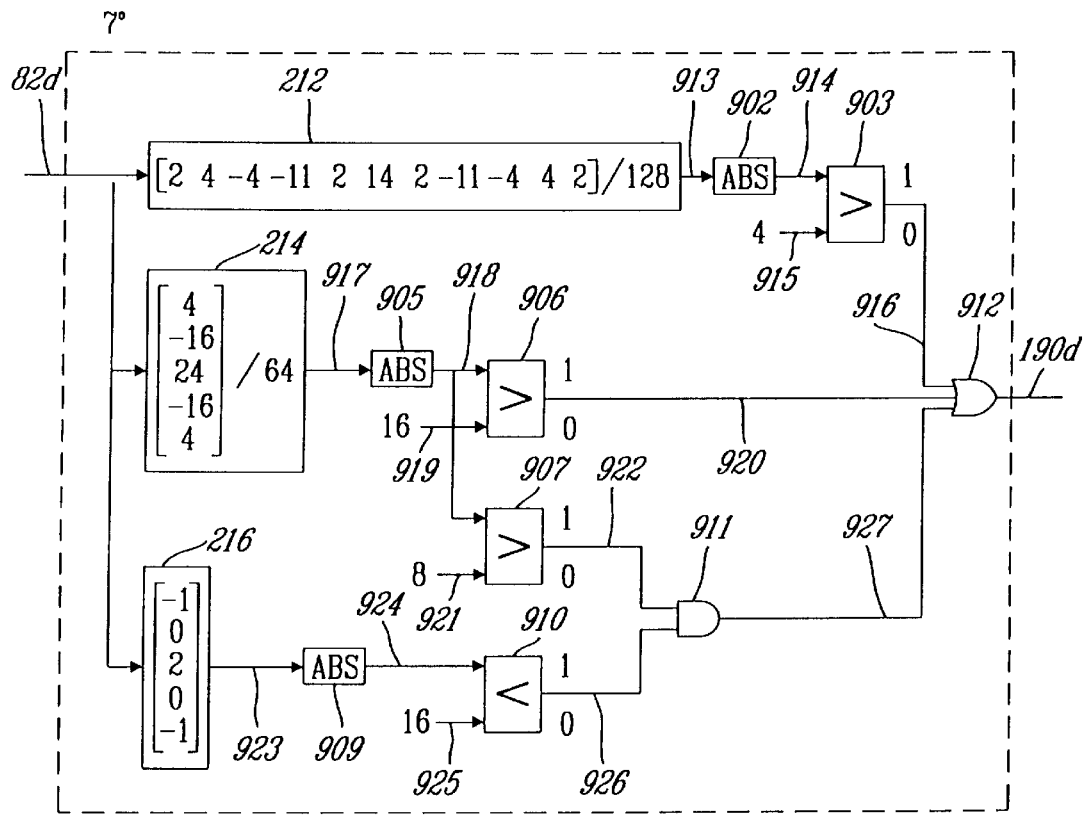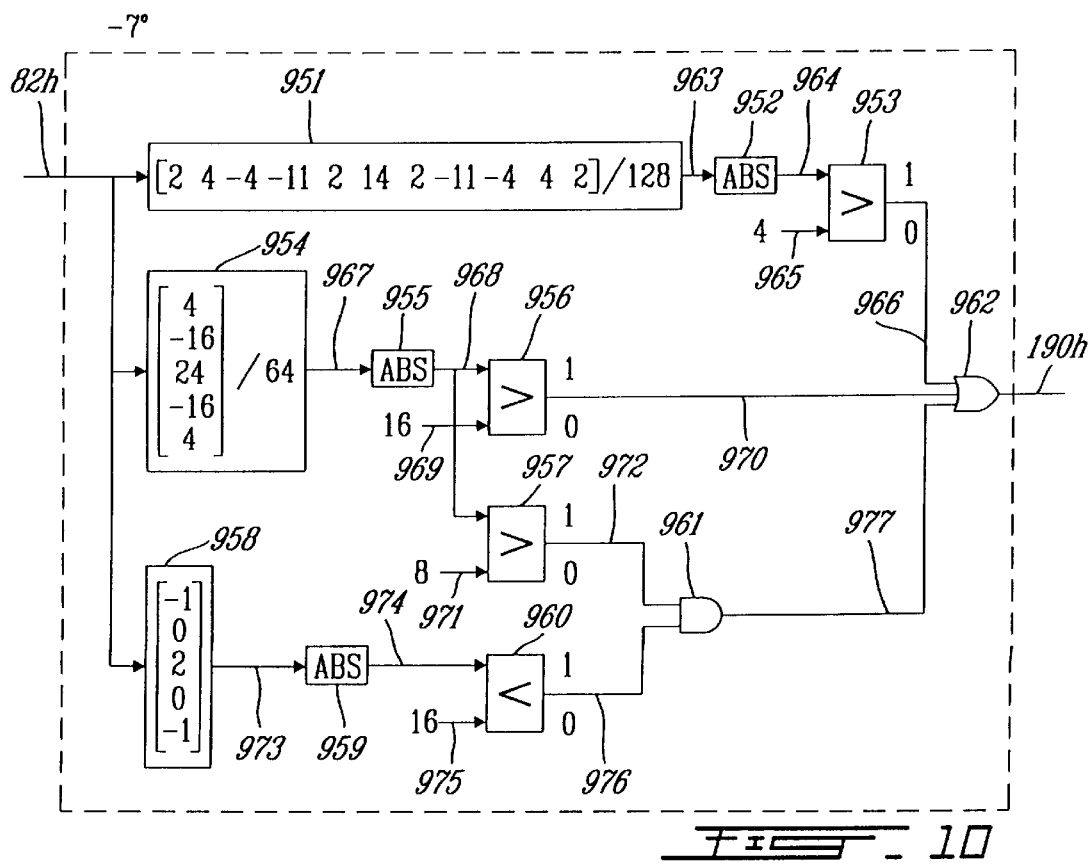
FIG. 10

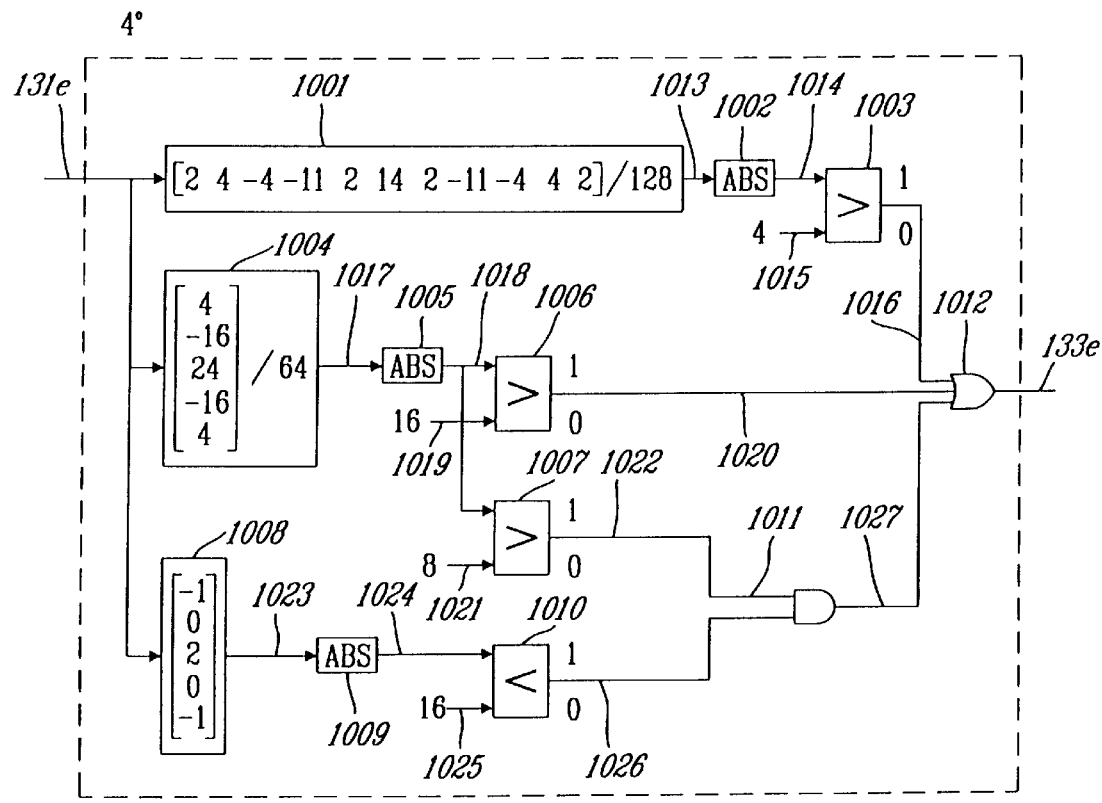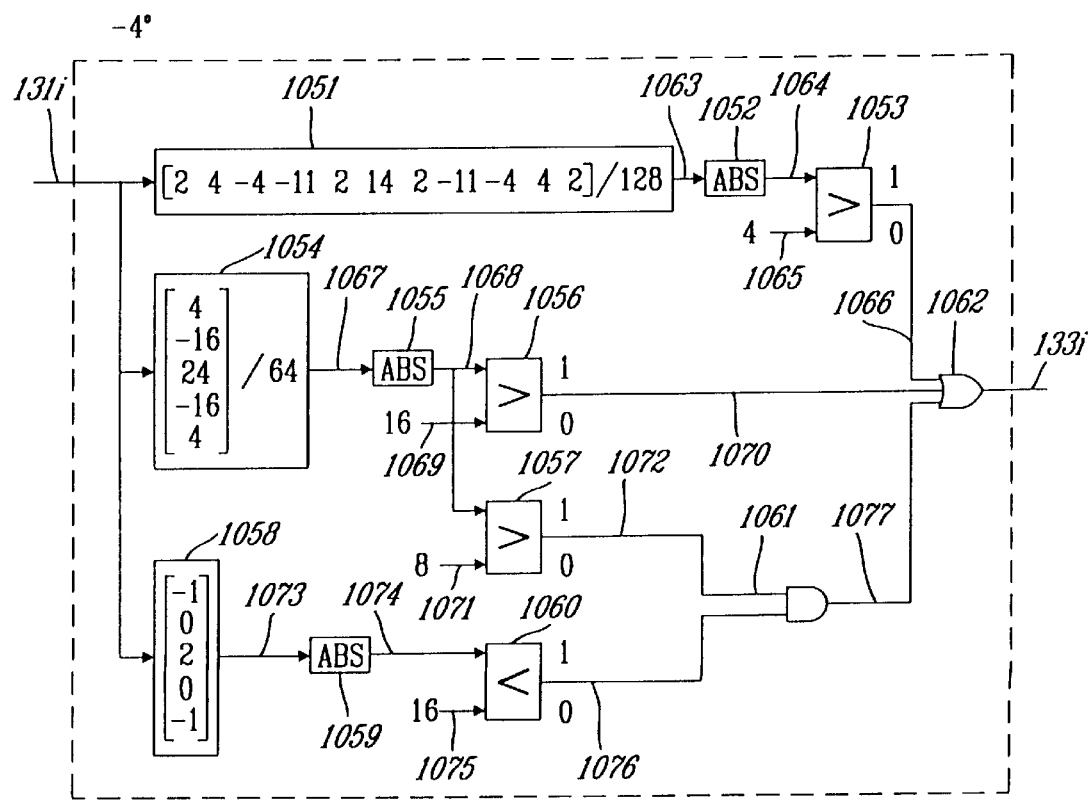
Fig. 11

Direction priority for MIN (90°,45°,−45°,30°,−30°,7°,−7°,4°,−4°)

LOGIC

Consolidation 1
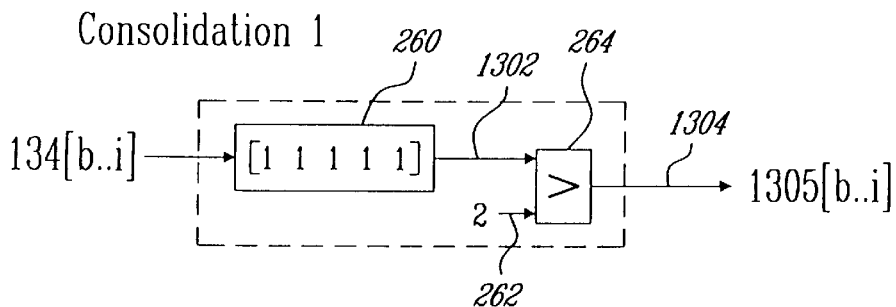
Consolidation 3
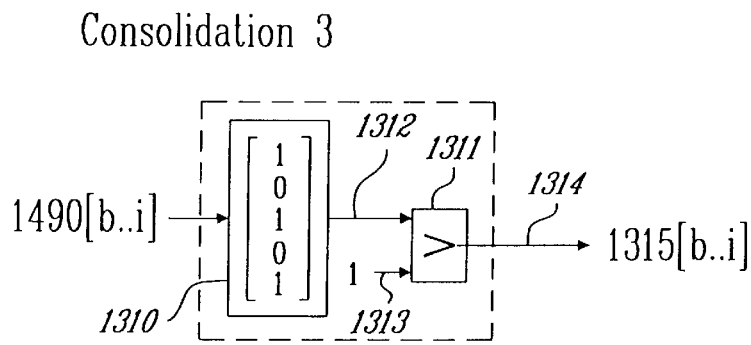
Consolidation 4
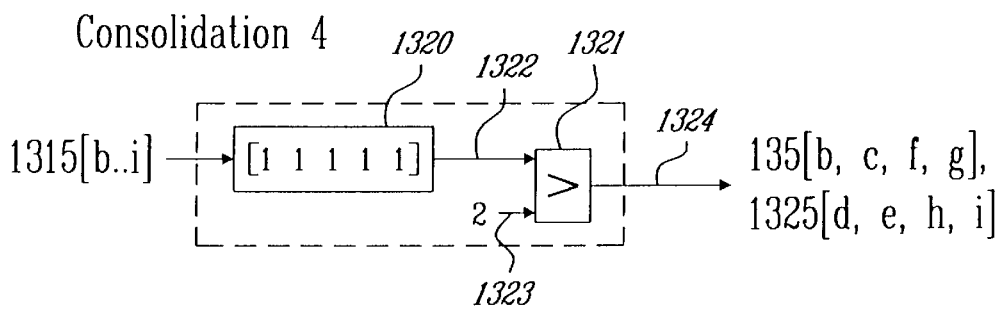
Consolidation 5 (for 7°,−7°,4° and −4° only)
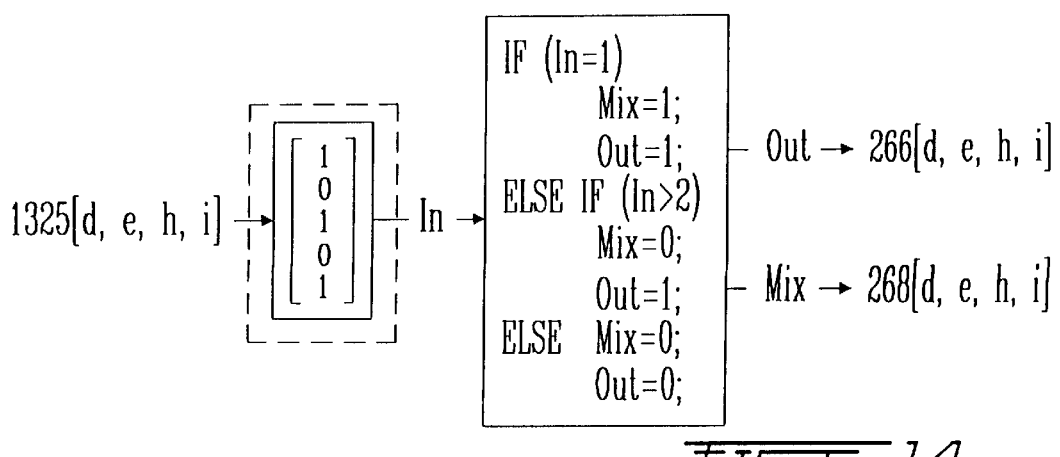
FIG. 14

Consolidation 2 (45°)
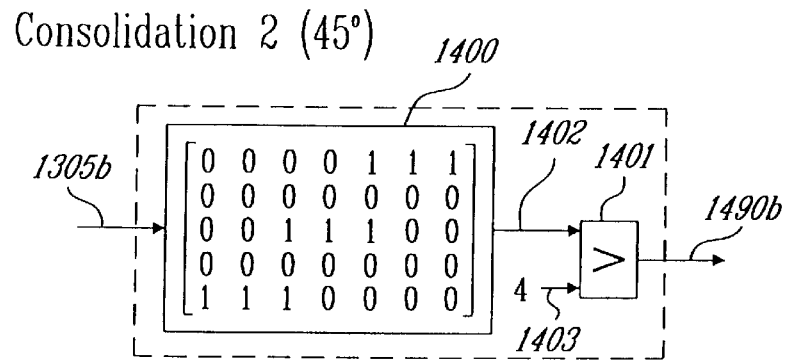
Consolidation 2 (-45°)
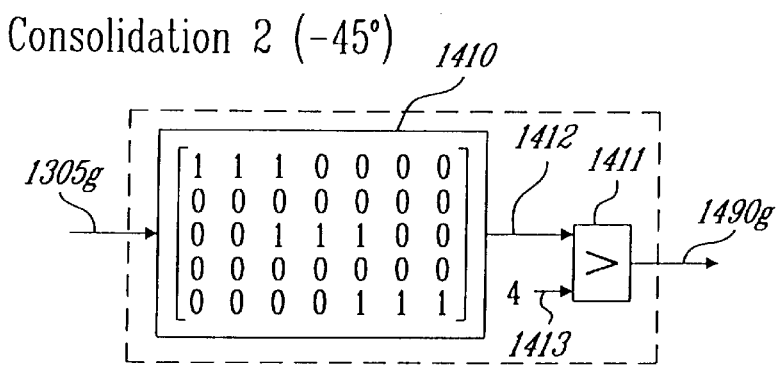
Consolidation 2 (30°)
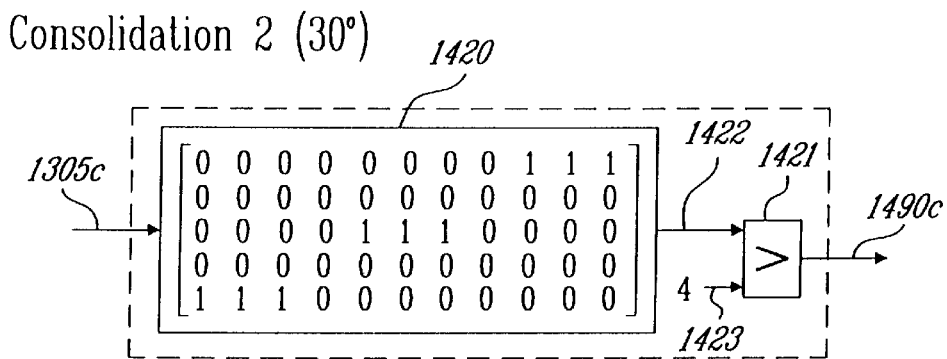
Consolidation 2 (-30°)
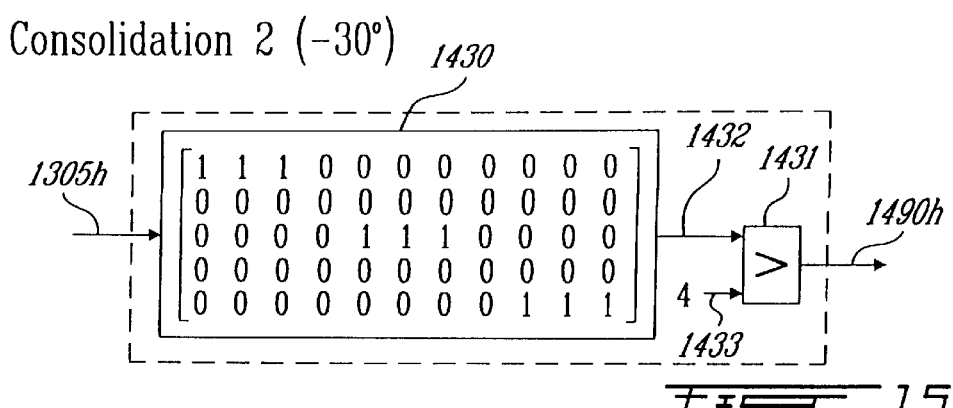
FIG. 15

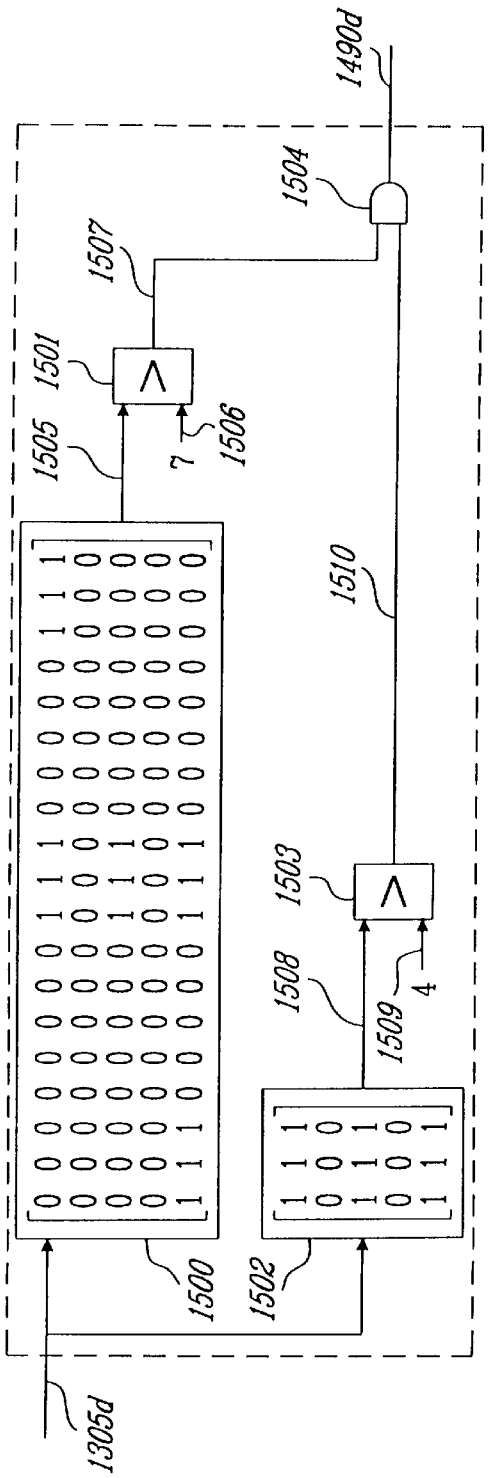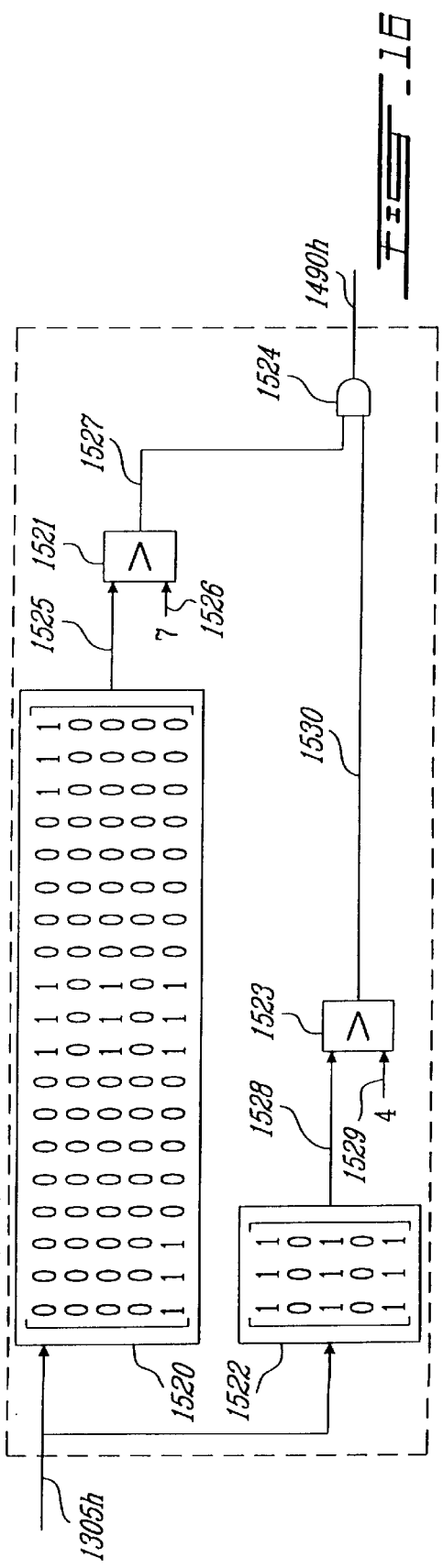
FIG. 16

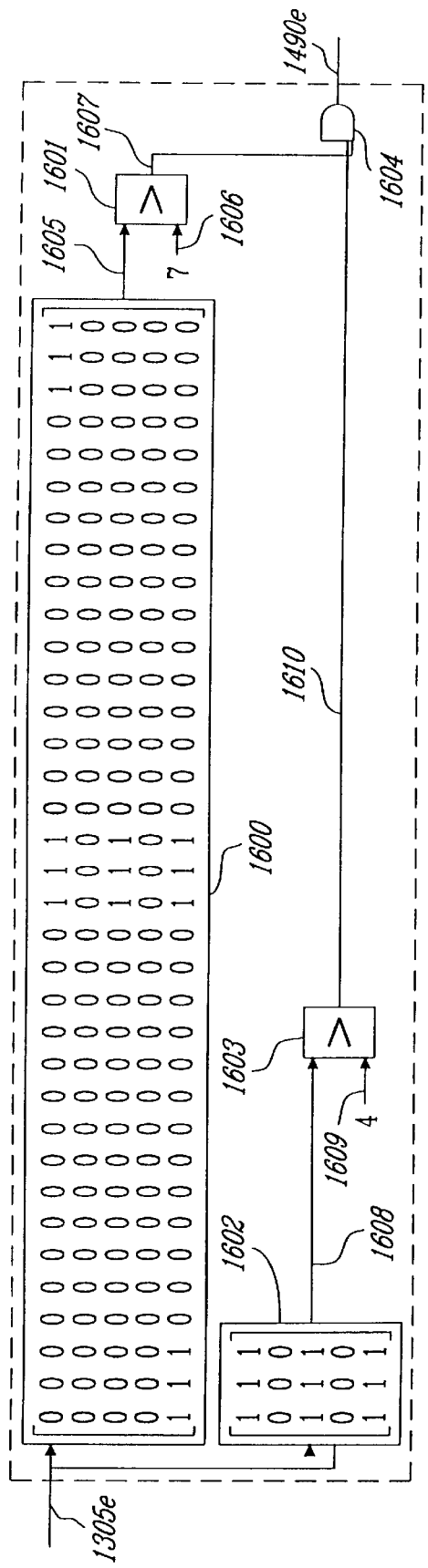
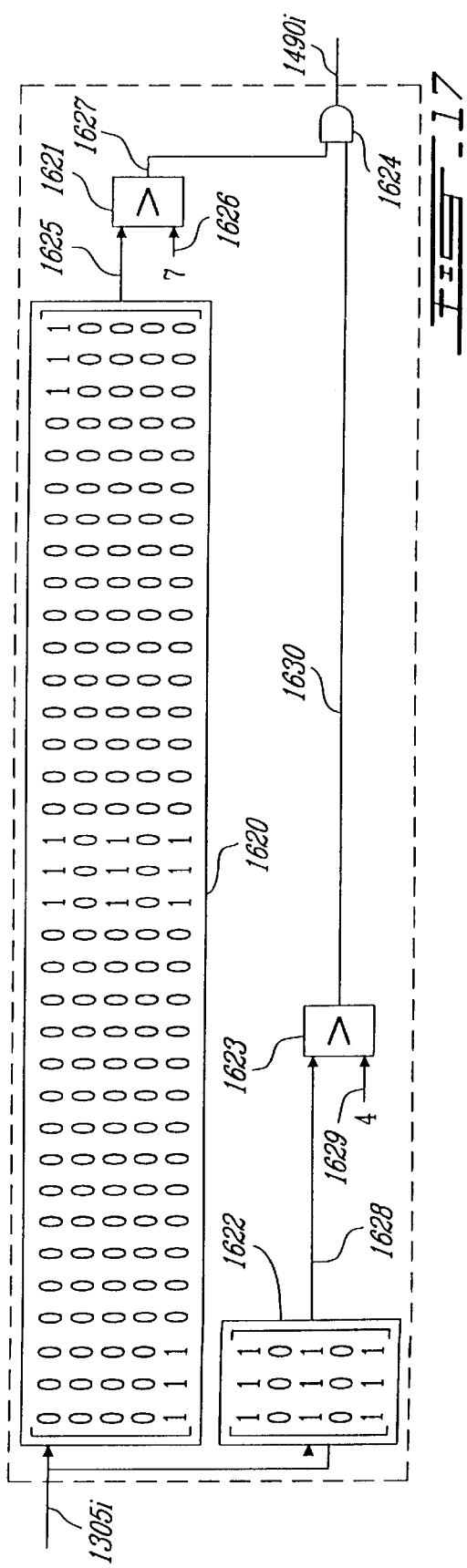
FIG. 17

```
IF (135b=1)
        DirOut=45°;
ELSE IF (135f=1)
        DirOut=-45°;
ELSE IF (135c=1)
        DirOut=30°;
ELSE IF (135g=1)
        DirOut=-30°;
ELSE IF ( (135d=1) AND (150d=0) )
        DirOut=7°;
ELSE IF ( (135d=1) AND (150d=1) )
        DirOut=7° Mixed with 90°;
ELSE IF ( (135h=1) AND (150h=0) )
        DirOut=-7°;
ELSE IF ( (135h=1) AND (150h=1) )
        DirOut=-7° Mixed with 90°;
ELSE IF ( (135e=1) AND (150e=0) )
        DirOut=4°;
ELSE IF ( (135e=1) AND (150e=1) )
        DirOut=4° Mixed with 90°;
ELSE IF ( (135i=1) AND (150i=0) )
        DirOut=-4°;
ELSE IF ( (135i=1) AND (150i=1) )
        DirOut=-4° Mixed with 90°;
ELSE DirOut=90°;
```

135[b..i] → (input)

150[d,e,h,i] → (input)

270 (block label)

→ DirOut (Dir + Mix) — 54

FIG. 18

*Vertical Interpolation*

$B_{2n} = (40/64)(B_{2n+1} + B_{2n-1}) - (8/64)(B_{2n+3} + B_{2n-3})$ $D_{2n} = (40/64)(D_{2n+1} + D_{2n-1}) - (8/64)(D_{2n+3} + D_{2n-3})$ $C_{2n+1} = (40/64)(D_{2n+2} + D_{2n}) - (8/64)(D_{2n+4} + D_{2n-2})$ $E_{2n+1} = (40/64)(E_{2n+2} + E_{2n}) - (8/64)(E_{2n+4} + E_{2n-2})$

*For n=0,1,2,3...*

*Temporal Interpolation*

$P_{2n} = (1/4)B_{2n} + (3/4)X_{C2n}$ $Q_{2n+1} = (3/4)C_{2n+1} + (1/4)X_{D2n+1}$ $R_{2n} = (1/4)X_{C2n} + (3/4)D_{2n}$ $S_{2n+1} = (3/4)X_{D2n+1} + (1/4)E_{2n+1}$

*For n=0,1,2,3...*

Fig. 28

HDTV UP CONVERTER

The present application continuation of PCT/CA98/00304 filed Apr. 3, 1998 designating the United States of America, now abandoned, and this application is related to U.S. patent application 08/916,960 filed Aug. 25, 1997, now U.S. Pat. No. 5,936,676.

BACKGROUND OF THE INVENTION

1. Field of the Invention

The present invention relates to video line interpolation, field rate converting and de-interlacing methods and apparatus for converting an interlaced standard video image into a progressive HDTV video image.

2. Description of the Prior Art

Up Converter is an interesting device for broadcasting at HDTV resolution or format an existing standard interlaced video signal into an HDTV video signal. An HDTV Up Converter can be essentially decomposed in three main parts: a field rate converter, a de-interlacer and a picture resizer. The combination of this three modules provide at the output a 60.00 Hz field (interlaced) or frame (progressive) rate having a 16:9 aspect ratio video signal. The major part in an HDTV Up Converter is the de-interlacer unit which converts the incoming interlaced video signal into a progressive video output. This progressive output permits in turn an easy vertical resizing. The present invention focuses on the first two modules of the HDTV up converter, thus providing improved methods and devices for the field rate conversion and for the de-interlacing a video image.

In today's broadcasting industry, more an more video presentations, such as movies and documentaries, must be converted from their original interlaced video format having 59.94 fields per second into the new High Definition Television (HDTV) video format, usually having 60.00 fields per second and a different image aspect rate, 16:9 rather than 4:3 for the standard format. For doing so, a large variety of solution have been proposed, each offering, however, only a partial solution to the problem.

For raising the field frequency of a video image from 59.94 Hz to 60.00 Hz, one new field must be added in each sequence of 1000 existing fields. This is usually done by repeating one video field, which does not give reliable results since the image will remain still for a longer time interval so it will often be perceived by the human eye. The second problem, i.e. de-interlacing a video image, is solved by inserting new video lines among the existing interlaced video lines.

In the patents U.S. Pat. No. 4,677,483 and GB-2,197,152A, fixed spatio-temporal filters are suggested for interpolation. However, this conversion technique introduces some artifacts such as line flicker and serration of diagonal edges. In U.S. Pat. No. 4,636,857, vertical filter and temporal filter are adaptively used according to a motion detector output. In U.S. Pat. No. 4,989,090, the adaptation is done by combining, in a suitable manner, vertical linear filter and temporal median filter results. The shortcomings are the resolution loss for moving parts in the picture, the staircase effect on moving diagonal edges. In U.S. Pat. No. 5,001,563, the interpolator is a spatio-temporal median filter in which the spatial inputs are selected along with estimated edge direction. There are still some defaults with this technique: the given edge detectors are not very reliable for a noisy or high frequency signal. This phenomenon produces some temporal flickers since the adaptation at a given edge can be different from frame to frame. The suggested spatial interpolation yields some resolution loss in the still parts of the picture. The median filter, which is excellent for preserving the edges, can give some unnatural results. In U.S. Pat. No. 5,019,903 and U.S. Pat. No. 5,347,599 the interpolations are edge-based and purely spatial which result in similar defaults caused essentially by the edge detection technique. Moreover, when the number of considered edge direction is small, for example three (3) directions for 45°, 90° and 135°, the staircase effect becomes noticeable for nearly horizontal and long edge in the picture.

The present de-interlacer structure is similar to the one disclosed in U.S. patent application No. 08/916,960 now U.S. Pat. No. 5,936,676 and corresponding CAN patent application # 2,213,606 by the same applicants. However, nearly horizontal edges and new edge direction detection techniques will now be considered.

In the case of field rate converter from 59.94 to 60.00 Hz, the reference literature is very restrictive. Usually frame-repeating technique is used at the end of 1000 incoming fields or when a low motion or a still picture is detected in this time window. Generally, frame repeating can create a noticeable motion discontinuity.

SUMMARY OF THE INVENTION

It is therefore an object of the present invention to provide an up converter apparatus for converting an interlaced video signal into a progressive HDTV video signal. Particularly, the present invention provides an improved video frame frequency converter for converting the lower frequency of an interlaced video signal into a higher frequency of an intermediate video signal which is then de-interlaced by the second device of the invention, namely the de-interlacer.

According to the preferred embodiment of the invention, the apparatus comprises line interpolation means for producing at least one of temporally and spatially interpolated video signals using information from at least one field of the interlaced video input signal. The interpolated signals are suitable for a)-still part of picture, b)-moving horizontal edges and c)-various directions along edge. The apparatus comprises various detection means for the above-mentioned conditions. Particularly, the edge direction detection means are robust for nearly horizontal edges in the presence of noise or in high frequency picture part. The proposed method for edge direction detection is composed in two steps: a)-interpolation in all considered directions and b)-selection of the "best" direction among these interpolation results. The considered directions are chosen in function of the knowledge of human visual system. The apparatus comprises also a resizing means to convert part of 4:3 aspect ratio progressive picture to 16:9 HDTV format which is not presented in the following text since it is well known in the art.

According to another broad aspect of the present invention, there is provided an apparatus for producing, for example, a 60.00 Hz field (frame) rate HDTV format video signal from a 59.94 Hz interlaced video input signal. The apparatus comprises picture deletion and insertion means for deleting appropriately a lower number of incoming frames and inserting a higher number of new frames in order to produce the exact field rate of 60.00 Hz. The two new pictures are preferably not repeated frame but rather interpolated from the incoming signal. The proposed "deleting one-inserting two" technique reduces substantially the motion discontinuity. The apparatus comprises also various detector means for determining subjectively favorable conditions in picture deletion/insertion. In a 50.00 Hz system, picture frame rate converter is not necessary.

An object of an aspect in the present invention is to provide a video de-interlacer in which the degradation of diagonal or nearly horizontal edges, moving or fixed, can be reduced.

An object of an aspect in the present invention is to provide a line interpolation apparatus and method in which the edge direction, nearly horizontal or not, is robust in the presence of noise or in high frequency picture parts.

Another object of an aspect of the invention is to provide a line interpolation apparatus or method in which high resolution in still picture parts is fully preserved.

Yet another object of an aspect of the invention is to provide a line interpolation apparatus and method in which the flicker of vertically moving horizontal edges is reduced.

Yet another object of an aspect of the invention is to provide an efficient field rate converter from 59.94 to 60.00 Hz in which motion discontinuity are subjectively minimized.

According to a broad aspect of the invention, there is provided an apparatus for producing an output HDTV format video component signal from an input interlaced video component signal.

For 60 Hz system, the apparatus comprises a 59.94 Hz to 60.00Hz field rate converter, a line doubler and a format resizer. For 50 Hz system, the apparatus comprises a line doubler and a format resizer.

The 59.94 to 60.00 Hz proposed converter comprises two major features for a)-frame insertion condition detection, b)-frame interpolation and frame insertion.

The insertion condition detection in a time frame of 1000 incoming frames is the first happened event of a)-nearly-static picture, b)-scene change, c)-reduced motion activity picture and d)-end of time frame. The first three conditions are based on a proposed measure of motion activity indice, which is simply the mean of absolute frame difference value.

Substituting one incoming frame by two new interpolated frames does the proposed frame insertion. The two new frames result simply from a suitable separable vertical temporal linear interpolation.

The line doubling technique is a combination of three main interpolations: a)-temporal interpolation for picture still parts, b)-vertical interpolation for vertically moving horizontal edges and c)-steered spatio-temporal interpolation along edges. The third proposed interpolation could be divided further by two categories: a)-purely directional along well-detected edges and b)-vertical and directional for weakly detected edges. The last type of interpolation is a compromise for nearly horizontal weak edges.

The associated detectors for the interpolation are a)-motion detection using four-field motion information, b)-vertical motion detection for horizontal edge and c)-edge detection. The proposed edge detection is extended for following nine edges 90°, 45°, 30°, 7°, 4°, −4°, −7°, −30° and −45° suitable with the human visual system. Moreover, the edge detection is done in two steps a)-interpolate the image in all given directions and b)-select the direction with minimum variation in the result. Various consolidation schemes are proposed in order to get a robust decision even in the present of noise or in the high frequency picture parts. Compromise decision for weak and nearly horizontal edges is also proposed.

In the preferred embodiment of the invention related to the field frequency converter, there is provided a method and an apparatus for converting an incoming interlaced video signal from a lower field frequency, such as 59.94 Hz to a higher field frequency, such as 60.00 Hz, as needed by the HDTV video format. This is realized by adding supplementary video fields at each sequence of a predetermined number of fields, such as 1000 fields, for increasing the field frequency. In fact, as already mentioned, two fields (one frame) may be deleted from the sequence of fields, but it serves to create four other interpolated video fields which are added to the sequence of fields, thus increasing the number of fields by two fields (one frame). This process increases the field frequency from 59.984 Hz to 60.00 Hz. The same technique may be applied to a progressive video signal, and in this case the apparatus will use frames instead of fields for deleting and adding.

The preferred embodiment of the present invention also relates to the precise moment when the field (or frame) inserting process is performed. The best moment for doing the process, so that the human eye does not perceive any abrupt change in the video image, is when the video image is either still or moves very rapidly. A motion detector detects the motion indice which is continuously processed in order to detect the best moment for adding a field to the images. A count detector allows keeping track of the number of fields and commands the insertion of the additional field each 1000 fields, even if the best inserting conditions did not occur until reaching 1000 fields, so that the frequency conversion is performed constantly, in every sequence of 1000 fields.

According to the present invention, there is provided a video frame frequency converter for converting a standard video signal having a first frame frequency into an intermediate video signal having a higher second frame frequency, said video frame frequency converter comprising:

a converter input for receiving said standard video signal;

a frame insertion detector means for analyzing said standard video signal and for detecting a best moment for adding at least one new frame in a sequence of existing frames of said standard video signal;

means for generating an accelerated video signal from said standard video signal, said accelerated video signal having said higher second frame frequency;

insertion means for inserting at least one frame into said sequence of existing frames of said accelerated video signal for increasing a number of frames of said sequence having a predetermined duration, said insertion means outputting said intermediate video signal having said higher frame frequency; and a converter output for providing said intermediate video signal.

Another object of the invention is to provide a method for converting a standard video signal having a first frame frequency into an intermediate video signal having a higher second frame frequency, said method comprising the steps of:

accelerating said standard video signal from said lower frame frequency to said higher frame frequency thus producing an accelerated video signal;

analyzing said standard video signal for detecting a best moment for adding at least one frame into a sequence of existing frames, and for producing an insert frame control signal; and upon control of said insert frame control signal, adding said at least one frame in said sequence of existing frames, thus producing said intermediate video signal.

Still another object of the invention is to provide a video frame frequency converter for converting a standard interlaced video signal having a first frame frequency into an intermediate interlaced video signal having a higher second frame frequency, said video frame frequency converter comprising:

a converter input for receiving said standard interlaced video signal;

means for generating an accelerated interlaced video signal from said standard interlaced video signal, said accelerated video signal having said higher second frame frequency;

frame interpolator means for creating at least two new interpolated fields by interpolation of existing adjacent fields of said standard interlaced video signal; and insertion means for inserting said at least two new interpolated fields into a sequence of existing frames and outputting said sequence of frames including said interpolated fields at said higher second frequency as said intermediate interlaced video signal.

According to the preferred embodiment of the invention, there is also provided an improved edge direction detector to be used in a video de-interlacer for detecting at least one best direction from a set of pre-defined directions for producing a spatial direction control signal used for performing a spatio-temporal interpolation in said best direction, said edge direction detector comprising:

directional interpolator means for performing an interpolation for each one of said pre-defined directions using a past, a present and a future video field signal received at its input, said directional interpolator means outputting an interpolated signal comprising interpolated signals, for each pixel, for each of said pre-defined directions; and edge direction selector means for selecting said at least one best direction for interpolating using said interpolated signal received from said directional interpolator means.

According to the preferred embodiment of the invention, there is also provided an up-converter apparatus for converting a standard interlaced video signal into a progressive HDTV video signal, said up-converter apparatus comprising:

a video frame frequency converter for converting said standard interlaced video signal having a first frame frequency into an intermediate interlaced video signal having a higher second frame frequency, said video frame frequency converter comprising a converter input for receiving said standard interlaced video signal; means for generating an accelerated interlaced video signal from said standard interlaced video signal, said accelerated video signal having said higher second frame frequency; frame interpolator means for creating at least two new interpolated fields by interpolation of existing adjacent fields of said standard interlaced video signal; insertion means for inserting said at least two new interpolated fields into a sequence of existing frames and outputting said sequence of frames including said interpolated fields at said higher second frequency as said intermediate interlaced video signal; and a frame insertion detector means for analyzing said standard video signal and for detecting a best moment for adding at least one new frame in said sequence of existing frames of said standard video signal, said frame insertion detector means producing an insert frame control signal when said best moment is detected; and an edge direction detector to be used in a video de-interlacer receiving at an input said intermediate interlaced video signal for detecting at least one best direction from a set of pre-defined directions for producing a spatial direction control signal used for performing a spatio-temporal interpolation in said best direction, said edge direction detector comprising directional interpolator means for performing an interpolation for each one of said pre-defined directions using a past, a present and a future video field signal received at its input, said directional interpolator means outputting an interpolated signal comprising interpolated signals, for each pixel, for each of said pre-defined directions; and edge direction selector means for selecting said at least one best direction for interpolating using said interpolated signal received from said directional interpolator means.

BRIEF DESCRIPTION OF THE DRAWINGS

The present invention is described and will be better understood with reference to the following drawings, in which:

FIG. 1 is a general block diagram illustrating the main parts of an HDTV up converter, in which FIG. 1a illustrates the preferred embodiment of the invention for a 60.00 Hz system and FIG. 1b refers to a 50.00 Hz system;

FIG. 4 illustrates the pixel positions used for various line interpolations;

FIG. 8 is the high frequency detector for direction 45° and −45° according to the preferred embodiment of the invention;

FIG. 10 is the high frequency detector for direction 7° and −7° according to the preferred embodiment of the invention;

FIG. 11 is the high frequency detector for direction 4° and −4° according to the preferred embodiment of the invention;

FIG. 14 represents the edge binary filters in consolidations 1, 3, 4, 5;

FIG. 15 illustrates the edge binary filters for directions 45°, −45°, 30°, −30° in consolidation 2;

FIG. 16 illustrates the edge binary filters for 7°, −7° in consolidation 2;

FIG. 17 illustrates the edge binary filters for 4°, −4° in consolidation 2;

FIG. 18 represents direction decision block diagram in a pseudo code format;

FIG. 28 represents the separable vertical temporal filters for frame interpolation according to the preferred embodiment of the invention.

DETAILED DESCRIPTION OF THE PREFERRED EMBODIMENTS

Figure 1:
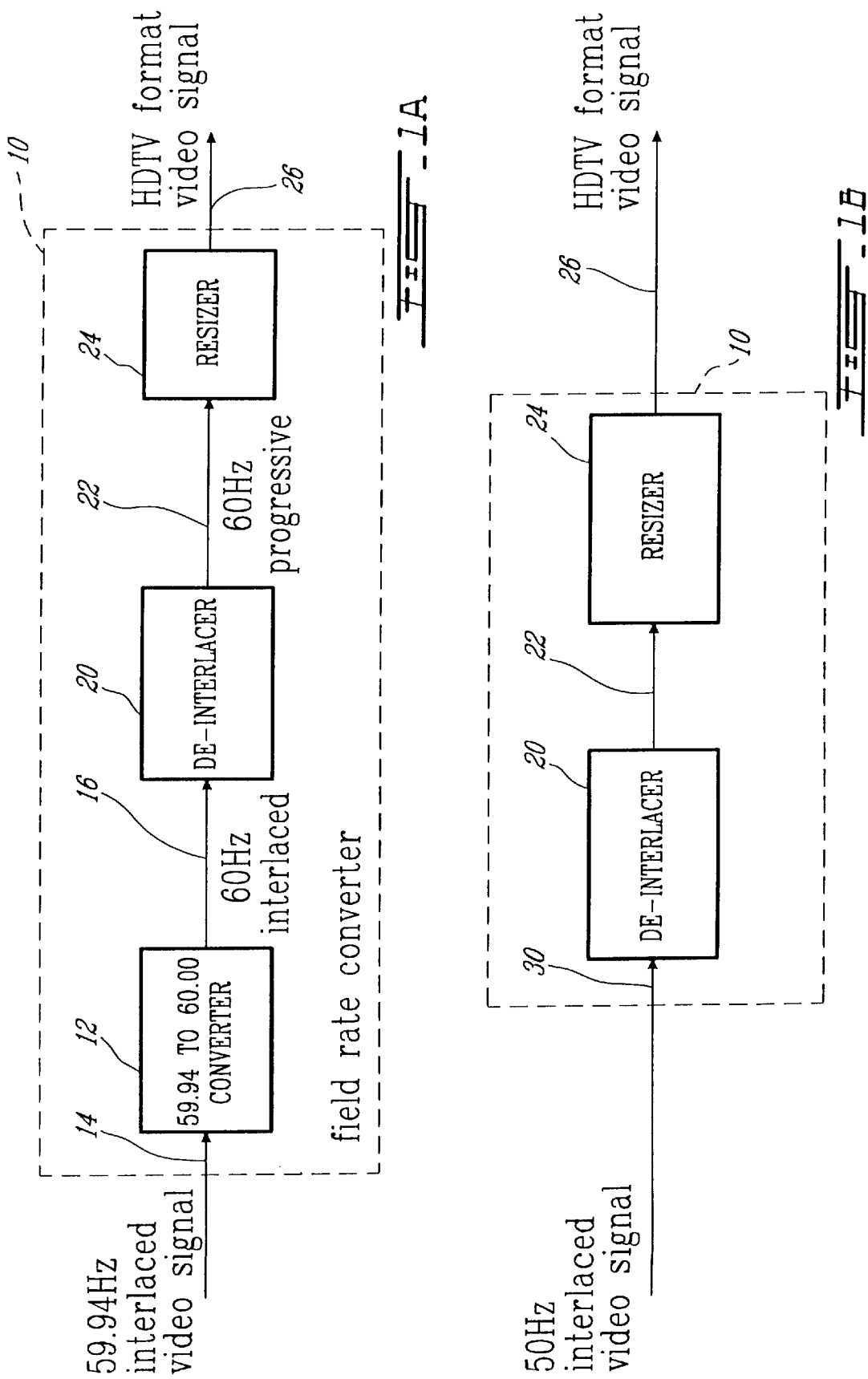

Referring now to the drawings, FIG. 1a illustrates the three main parts of an up converter 10. The first part of the system is a video frame frequency or field rate converter 12, which accepts, according to the preferred embodiment of the invention, a lower frequency video signal, such as a 59.94 Hz interlaced video signal input 14 and outputs a higher video frame frequency signal, such as a 60 Hz interlaced video signal 16. The output video signal output 16 is an intermediate interlaced video signal 16 which has exactly 60 video fields by second and thus complies with the HDTV field frequency standard. The intermediate video signal 16 then enters a de-interlacer 20 whose function is to provide a progressive video signal 22 having the same input picture aspect ratio of 4:3 as the signal 14. The progressive video signal 22 allows a resizer 24 to convert easily its input signal 22 into a progressive HDTV video signal 26 having an aspect ratio of 16:9. The resizer 24 is mainly composed of separable vertical and horizontal digital interpolation filters. Since the filtering technique is relatively well known in the art, the resizer 24 will not be discussed in detail in the present text.

The progressive HDTV video output 26 can be further transformed, if necessary, into an interlaced HDTV signal by deleting the appropriate lines in each image or picture. This line decimation or deletion is not shown in FIG. 1.

The present invention also apply to the European version of the HDTV standard, where the HDTV signal has a frequency of 50 Hz. Since the standard interlaced video signal 30 has the same frequency, in such a system the field frequency converter 12 is no longer needed. As illustrated in FIG. 1b the interlaced video signal 30 is directly fed into the de-interlacer 20. In other words, according to the preferred embodiment of the invention, the de-interlacer 20 is functional for any field rate video input.

Figure 2:
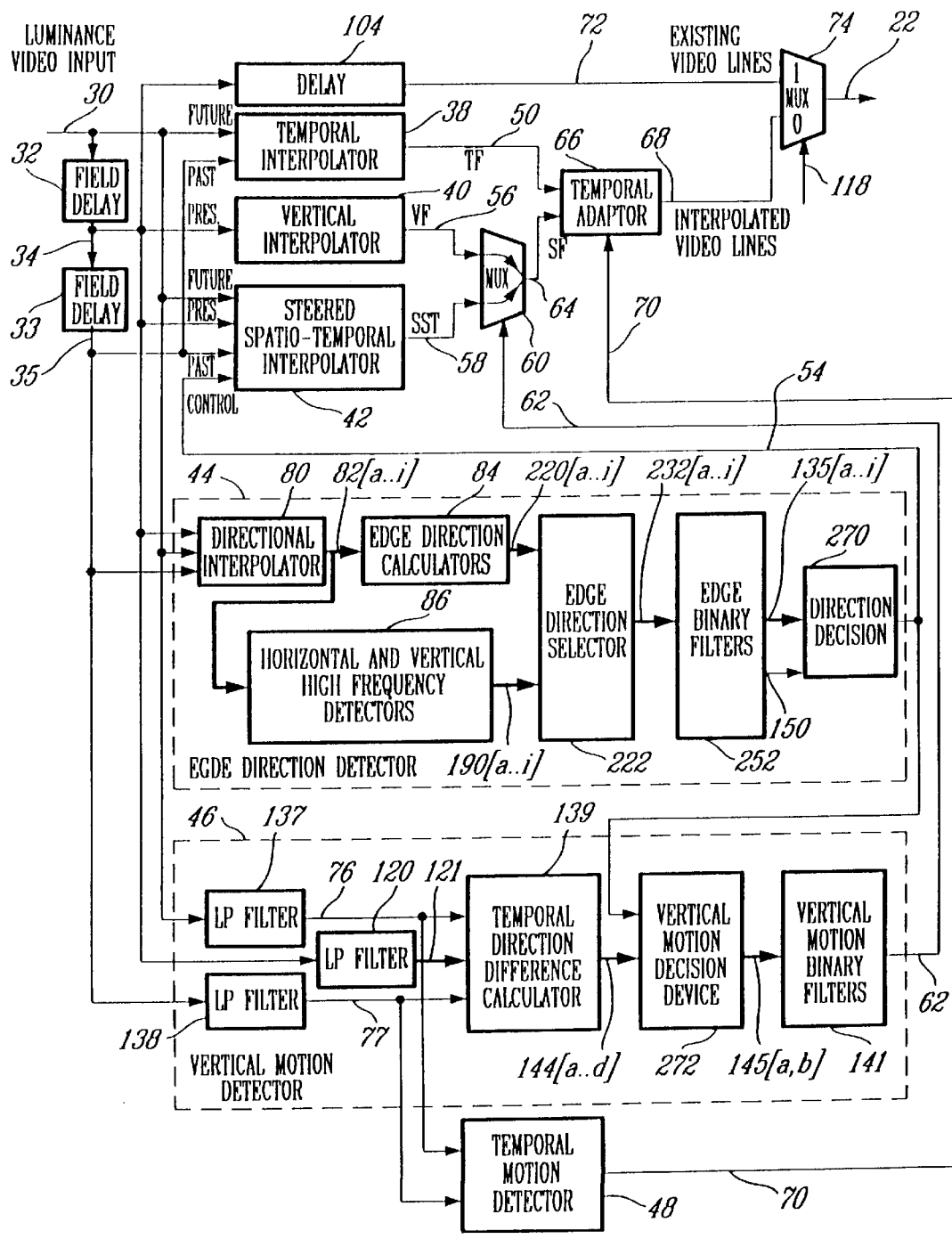
FIG. 2 is a detailed functional block diagram illustrating the preferred embodiment of the invention referring to the de-interlacer.
Figure 3:
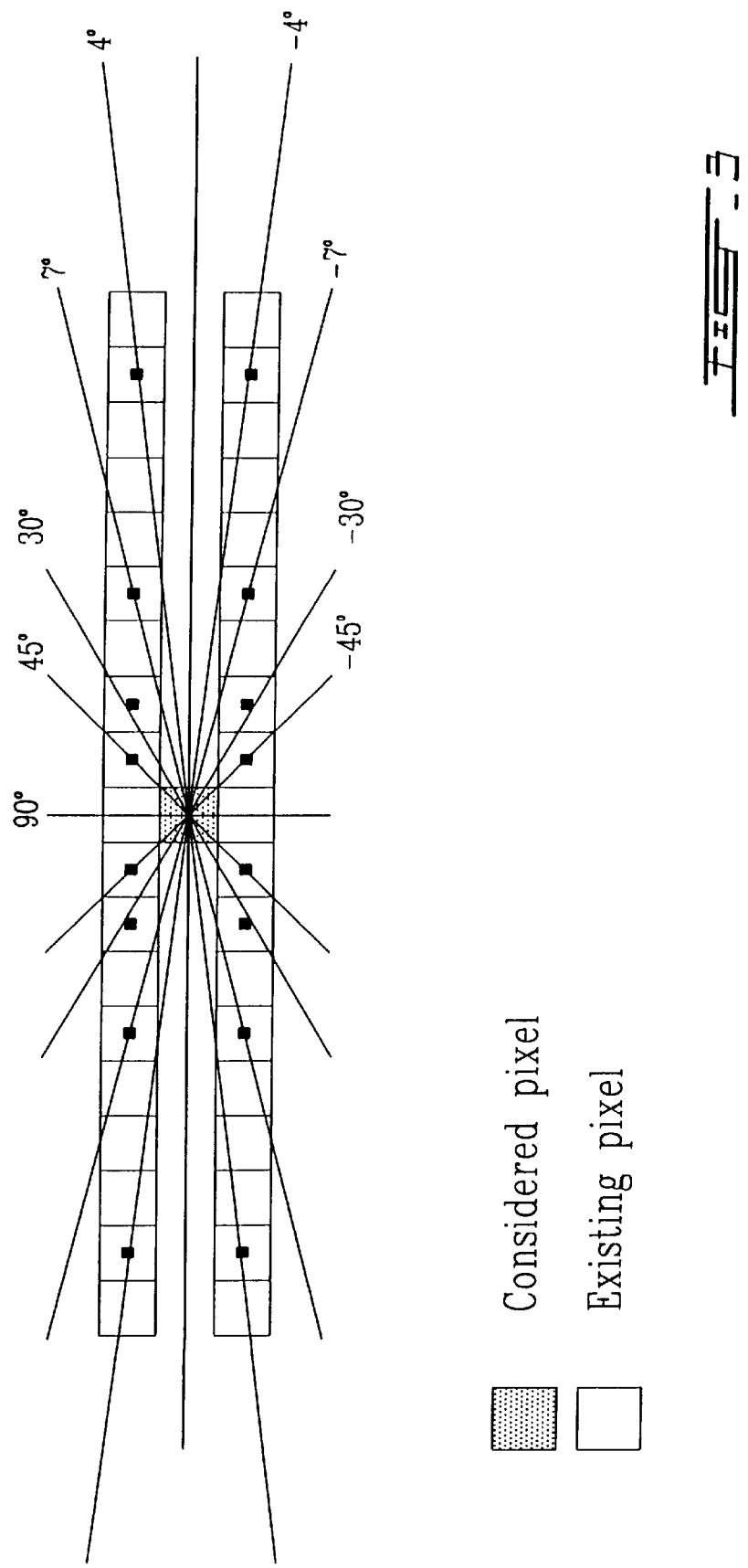
FIG. 3 illustrates the nominal pixel positions corresponding to nine considered edge directions.

FIG. 2 illustrates the proposed de-interlacer block diagram for interlaced digital luminance video input. The present invention provides an improved edge direction detector 44 which is part of the overall de-interlacer 20. The proposed system is an adaptive interpolator that combines the results from a pure temporal interpolation for picture still part, with a pure vertical interpolation for vertically moving horizontal edges, and with an edge-based steered spatio-temporal interpolation for the general case. Moreover, the edge direction number is extended up to 9, namely 4°, 7°, 30°, 45° and 90° for positive directions and −4°, −7°, −30° and −45° for negative directions, as illustrated in FIG. 3. The proposed directions are chosen approximately in a logarithmic order according to the human visual system. In fact, the picture result will be more pleasant if nearly horizontal edges are carefully interpolated.

Referring back to FIG. 2, the interlaced video input 30 is applied to two field delays 32 and 33 connected in series. These two field delays provide respectively two delayed video signals 34 and 35. According to the preferred embodiment, the video signals 35, 34 and 30 represent respectively the past, the present and the future video fields. These signals are sent in a suitable manner to the three interpolators 38, 40 and 42 and to the three detectors 44, 46 and 48. The cited detectors control in turn the system adaptation in order to provide a final interpolated signal output.

The first interpolator 38, namely the temporal interpolator 38, provides an average signal from the past frame signal 35 and the future frame signal 30. Precisely, the temporal output 50 is given by the following expression:

$$TF=(B_0+C_0)/2 \qquad (1)$$

wherein B is a next field pixel value spatially corresponding to the pixel to be interpolated and C is a similar position pixel value in the previous field. Various pixel positions for interpolation are better illustrated in FIG. 3.

The vertical interpolator 40 accepts only as input the present field video signal 34. The vertical interpolator's outputs 40, also designated by VF, is given by the following equation:

$$VF=(5A_0+5A'_0-F_0-F'_0)/8 \qquad (2)$$

wherein

A and A' are values of adjacent pixels respectively corresponding to the preceding and to the following existing lines in the vertical direction of the pixel to be interpolated.

F is value of existing pixel adjacent to pixel A in the vertical direction. F' is also vertically adjacent to A' as illustrated by FIG. 4.

The steered spatio-temporal interpolator 42 accepts the three above-mentioned interlaced video signals as input, namely the present field signal 34, the past field signal 30 and the future field signal 35, as well as a control signal 54, output by the edge direction detector 44. Depending on the state of the control signal 54, the steered spatio-temporal interpolator 42 computes one of the thirteen (13) following equations:

$$SST-4°=(4A_{-8}+4A'_8+2B_0+2C_0-D_{-16}-D'_{16}-E_{-16}-E'_{16})/8 \qquad (3)$$

$$SST+4°=(4A_8+4A'_{-8}+2B_0+2C_0-D_{16}-D'_{-16}-E_{16}-E'_{-16})/8 \qquad (4)$$

$$SST-7°=(4A_{-4}+4A'_4+2B_0+2C_0-D_{-8}-D'_8-E_{-8}-E'_8)/8 \qquad (5)$$

$$SST+7°=(4A_4+4A'_{-4}+2B_0+2C_0-D_8-D'_{-8}-E_8-E'_{-8})/8 \qquad (6)$$

$$SST-30°=(4A_{-2}+4A'_2+2B_0+2C_0-D_{-4}-D'_4-E_{-4}-E'_4)/8 \qquad (7)$$

$$SST+30°=(4A_2+4A'_{-2}+2B_0+2C_0-D_4-D'_{-4}-E_4-E'_{-4})/8 \quad (8)$$

$$SST-45°=(4A_{-1}+4A'_1+2B_0+2C_0-D_{-2}-D'_2-E_{-2}-E'_2)/8 \quad (9)$$

$$SST+45°=(4A_1+4A'_{-1}+2B_0+2C_0-D_2-D'_{-2}-E_2-E'_{-2})/8 \quad (10)$$

$$SST90°=(18A_0+18A'_0-2F_0-2F'_0+4B_0+4C_0-3D_0-3D'_0-3E_0-3E'_0+H_0+H'_0+G_0+G'_0)/32 \quad (11)$$

$$SST-4°\&90°=(SST-4°+SST90°)/2 \quad (12)$$

$$SST+4°\&90°=(SST+4°+SST90°)/2 \quad (13)$$

$$SST-7°\&90°=(SST-7°+SST90°)/2 \quad (14)$$

$$SST+7°\&90°=(SST+7°+SST90°)/2 \quad (15)$$

The first four equations, namely Eqs. 3 to 6, are computed when the condition "Mix" in the control signal 54 is OFF or "0". The last four equations, namely Eqs. 12 to 15 are computed when the condition "Mix" is ON or "1". Finally, the other equations, namely Eqs. 7 to 11, are independent from the condition "Mix". For a better understanding of the positions of the pixels employed for calculation in the first nine equations, namely $A_{\pm i}$, $A'_{\pm i}$, $B_{\pm i}$, $B'_{\pm i}$, $C_{\pm i}$, $C'_{\pm i}$, $D_{\pm i}$, $D'_{\pm i}$, $E_{\pm i}$, $E'_{\pm i}$, $F_{\pm i}$, $F'_{\pm i}$, $G_{\pm i}$, $G'_{\pm i}$, $H_{\pm i}$ and $H'_{\pm i}$ the reader is referred to FIG. 4.

Equation 1 is chosen in order to reduce the possible additive noise by a factor of 3 dB. Equation 2 illustrates the simplest four taps half-band filter and equations 3 to 10 are edge directed versions of a vertical temporal half-band filter, defined by the following equation:

$$VT=(4A_0+4A'_0+2B+2C-D_0-D'_0-E_0-E'_0)/8 \quad (16)$$

Applicants have found that these spatio-temporal filters give more pleasant results than those provided from purely spatial filters.

Referring now to Eq. 11, the SST90, which is the expression of a vertical interpolation, is also a vertical temporal filter similar to the one defined in Eq. 16. However, the vertical bandwidth of the filter in Eq. 11 is larger than the one defined in Eq. 16, when temporal frequency is nearly zero. This feature has been selected because the human visual system is more sensitive to still parts in a picture. Moreover, the filter described in Eq. 11 is different from the VT filter used in U.S. patent application No. 08/916960, mainly because it has a better vertical bandwidth and a shaper transition roll-off.

The interpolations described in Eqs. 12 through 15 with "Mix" condition "on", are proposed compromise techniques when detection results, for nearly horizontal edge, are found to be insufficiently reliable.

Referring back to FIG. 2, the two interpolated signals VF and SST, designated by numerals 56 and 58 respectively, are fed into a selector 60 which is controlled by a binary signal 62 provided from the vertical motion detector 46. When the control binary signal 62 is "ON", the selector 60 outputs an SF signal 64 which is chosen to be the vertical interpolator VF output 56. Otherwise, when the control binary signal 62 is "OFF", the multiplexer 60 selects the steered spatio-temporal interpolator output 58.

The selector SF output 65 and the temporal interpolator TF output 50 are combined in a temporal adapter 66 in order to provide a final interpolated video signal 68, for non existing lines of interlaced video input signal. The temporal adapter 66 is controlled by the motion indicative value 70, delivered by the temporal motion detection 48.

Finally, the interpolated video lines signal 68 and the existing video lines signal 72 are combined by the multiplexer 74. in order to generate the progressive luminance signal 22.

Associated with the three above-mentioned interpolation techniques, are the edge direction detector 44, the vertical motion detector 46 and the temporal motion detector 48.

The purpose of the temporal motion detector 48 is to locate rapidly moving or approximately still parts in an image. For doing so, it uses as input the low-pass filtered video signals 76 and 77 instead of their original ones 30 and 35 for possibly noisy signals.

The purpose of the vertical motion detector 46 is to locate moving horizontal lines in a video image sequence.

The edge direction detector 44 has two functions: the first one is to choose the best direction among the nine (9) possible directions for performing a steered interpolation. Its second function is to compute a compromise interpolation for insufficiently reliable nearly horizontal edges that are detected. The decision process is performed in two steps: first, the image is interpolated in all possible directions and the direction having the minimum variation is selected. The nine directional interpolators 80 receive as inputs the three video signals 30, 34 and 35 from the past, the present and the future fields. The interpolations are described by the nine Eqs. 3,4,5,6,7,8,9,10 and 11, each one representing one of the nine possible directions −4°, 4°, −7°, 7°, −30°, 30°, −45°, 45°, 90° respectively. The resulting nine interpolated output signals 82[a–i] are applied to the edge direction calculators 84 and the horizontal and vertical high frequency detectors 86.

Figure 5:
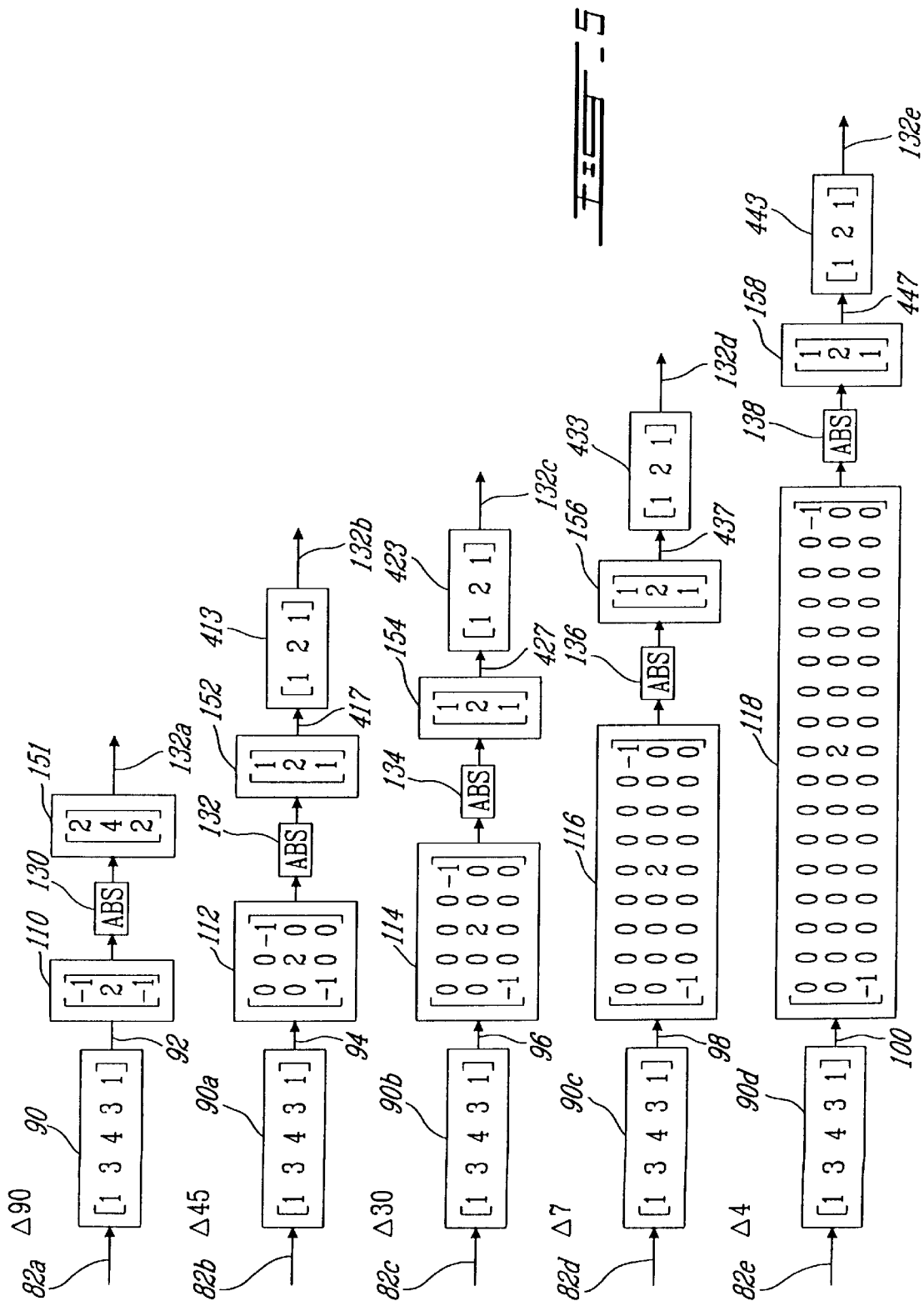
FIGS. 5 and 6 represent edge direction calculation for a series of directions corresponding to 90°, 45°, 30°, 7°, 4° and −45°, −30°, −7°, −4°.
Figure 6:
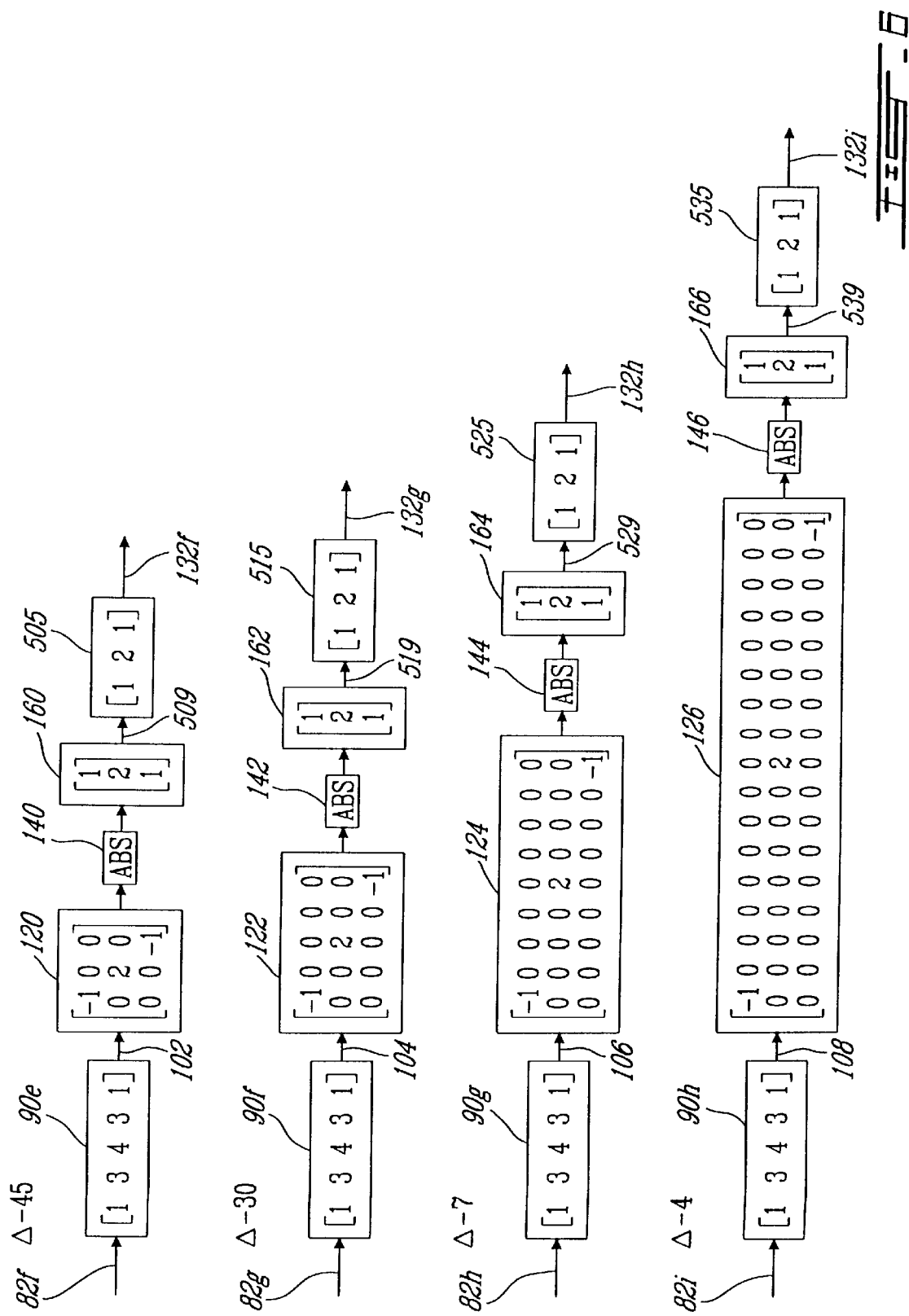

FIGS. 5 and 6 illustrates a detailed view of the edge direction calculators for the directions 90°, 45°, 30°, 7°, 4°, −45°, −30°, −7°, −4°. In these figures, each interpolated input signal, for example 82a, is sent into a horizontal low-pass filter 90 to remove eventually noise and strengthen horizontal edge. The impulse response of this linear-phase filter 90 is (1, 3, 4, 3, 1). The filter outputs 92, 94, 96, 98, 100 and 102, 104, 106 and 108 are then applied individually to their respective directional variation calculator, numbered 110 through 126. Generally, each calculator is a directional high-pass filter whose impulse response is given in FIGS. 5 and 6. The calculator outputs 110 though 126 are sent into absolute value devices, numbered 130 through 146, in order to convert the initial values into magnitudes of variation in the possible nine directions. The absolute value devices outputs are sent into their respective low-pass filters 151 through 166 to smooth out any eventual noise. Moreover, in order to favor the vertical direction (90°), its low-pass filter may only be a vertical filter having an overall gain two times lower than the one of the other directions. The low-pass filters for the other directions may be identical and may comprise a vertical filter and a horizontal filter. The impulse responses of these filters are shown in greater detail in FIGS. 5 and 6.

Referring back to FIG. 2, the directional interpolator 80 output 82[a–i], is sent as previously mentioned into the horizontal and vertical high frequency detectors 86. The purpose of the high frequency detectors is to locate high horizontal or vertical texture regions of the image that could introduce errors in the edge direction estimation process. Thus, the detectors 86 may need to be different for each considered direction.

Figure 7:
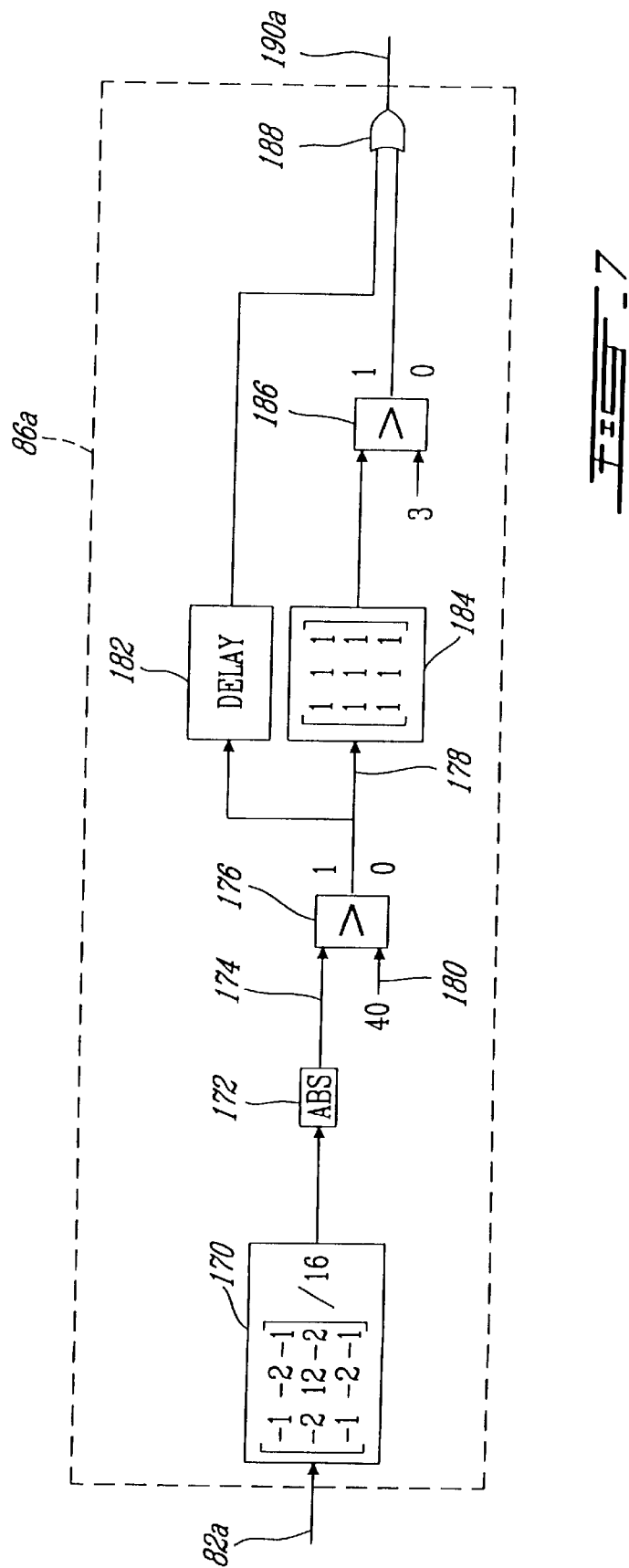
FIG. 7 is the high frequency detector for direction 90° according to the preferred embodiment of the invention.

FIG. 7 illustrates the high frequency detector 86a for vertical direction according to the preferred embodiment of the invention. The corresponding interpolated signal 82a is applied to the input of the detector 86, which detects the high frequency intensity by applying a Laplacian 170, followed by and an absolute value device 172. Its output 174 represents the magnitude of the high frequency signal and is applied to a detector 176, which is simply a level comparator. The comparator output is a binary signal 178 which is equal to 1 if the input signal 174 is greater than a threshold value 180. If not, the binary signal 178 is equal to 0. The threshold value 180 is set to be 40, according to the preferred embodiment of the invention. The binary output signal 178 is sent into a consolidating device, which can link together some isolated detections in a moving window 3×3. Details of the mentioned consolidating device are provided in same FIG. 7: it may be comprised of an appropriate delay 182, a filter 184, a comparator 186, and an OR gate 188. The gate output signal 190*a* represents a binary map of the high frequency region for the direction 90°.

FIG. 8 illustrates the high frequency detectors 86 for the directions 45° and −45°. In these detectors, according to the preferred embodiment of the invention, a pixel is said to be in a high frequency zones if the magnitudes of the horizontal or vertical high frequency components in the input signal 82*b* or 82*f* exceed some threshold values, with the exception of a specific high frequency pattern corresponding to the considered direction. For the 45° direction, the horizontal and vertical high frequency components are detected respectively by the high-pass filters 192 and 194. Meanwhile, the mask 196 defines the specific pattern for the 45° direction. For the direction −45°, the high-pass filters 198 and 200 do the same function while the mask 202 defines the −45° pattern. The impulse responses of these filters as well as details of the detection process are given in FIG. 8. The detector's binary signal outputs are the signals 190*b* and 190*f*, respectively for directions 45° and −45°.

Figure 9:
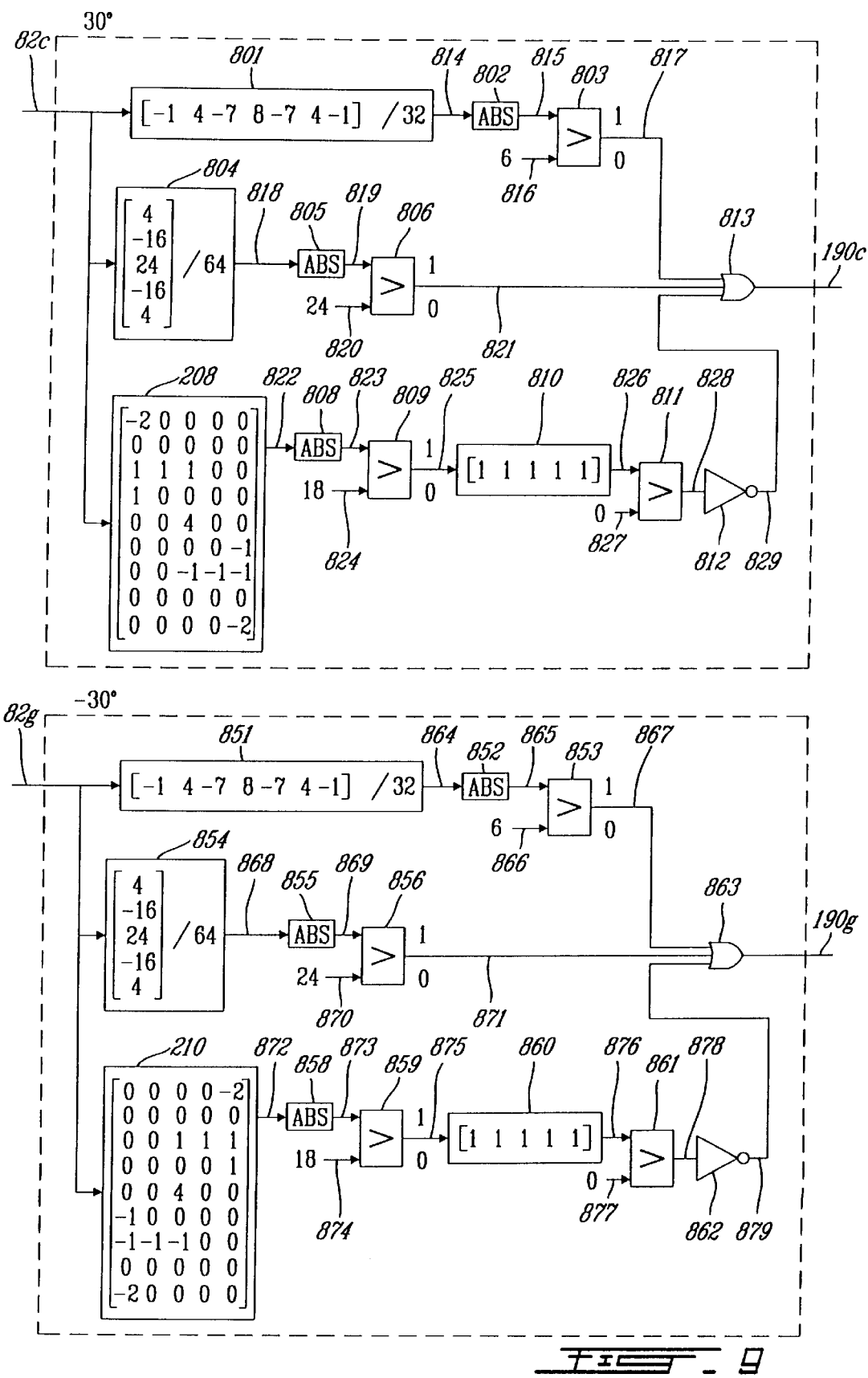
FIG. 9 is the high frequency detector for direction 30° and −30° according to the preferred embodiment of the invention.

FIG. 9 illustrates the high frequency detectors 86 for the directions 30° and −30°. The two detectors 86 are similar to those presented in FIG. 8. The only difference resides in the specific high frequency pattern. For the direction 30°, this is provided by the filter 208, while for the direction −30°, it is provided by the filter 210. The detector's binary signal outputs are 190*c* and 190*g* respectively for the directions 30° and −30°.

FIGS. 10 and 11 illustrate four identical detectors 86 for the four nearly horizontal directions 7°, −7°, 4°, and −4°. As an example, for the direction 7°, a horizontal filter 212 detects the horizontal high frequency component. A vertical filter 214 does the same job for the vertical high frequency component. Further, a vertical mask 216 may be used for the specific pattern. Other detection details are also given in these Figures. The detector 86 outputs the signals 190*d*, 190*h*, 190*e* and 190*i* respectively for the directions 7°, −7°, 4° and −4°.

Figure 12:
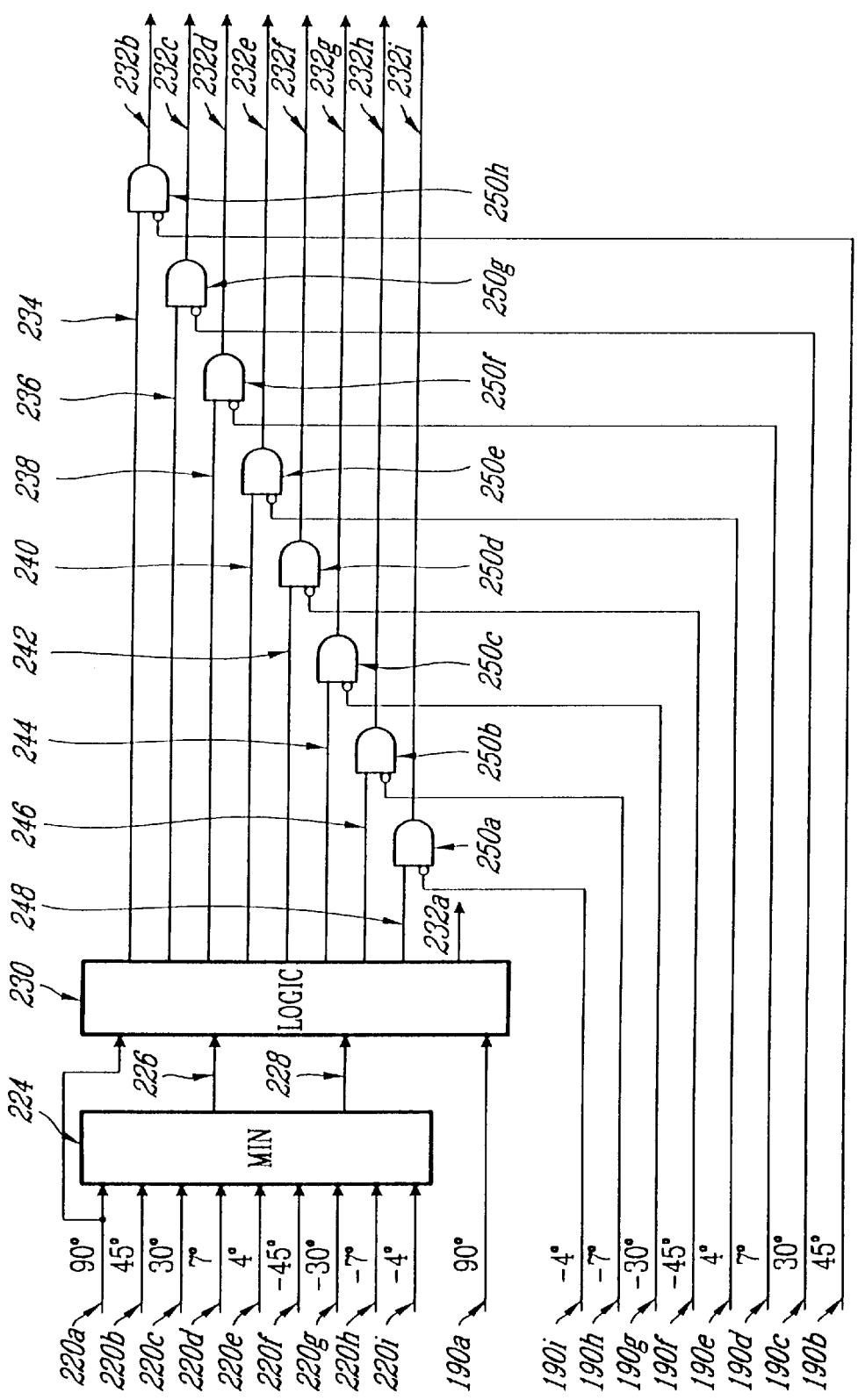
FIG. 12 is the edge direction selector according to the preferred embodiment of the invention.

Referring back to FIG. 2, the edge direction calculator 84 outputs 220[*a–i*] and the high frequency detector outputs 190[*a–i*] are sent together into the edge direction selector 222 better shown in FIG. 12. First, the nine edge direction variations 220 are sent to a minimum selector 224 which outputs a first signal 226 comprising data related to a minimum value and its corresponding direction, and a second signal 228 having corresponding data. If two or more equal minimum values are detected, the device 224 selects only one direction according to the following priority: 90°, 45°, −45°, 30°, −30°, 7°, 7°, 4° and −4°.

Figure 13:
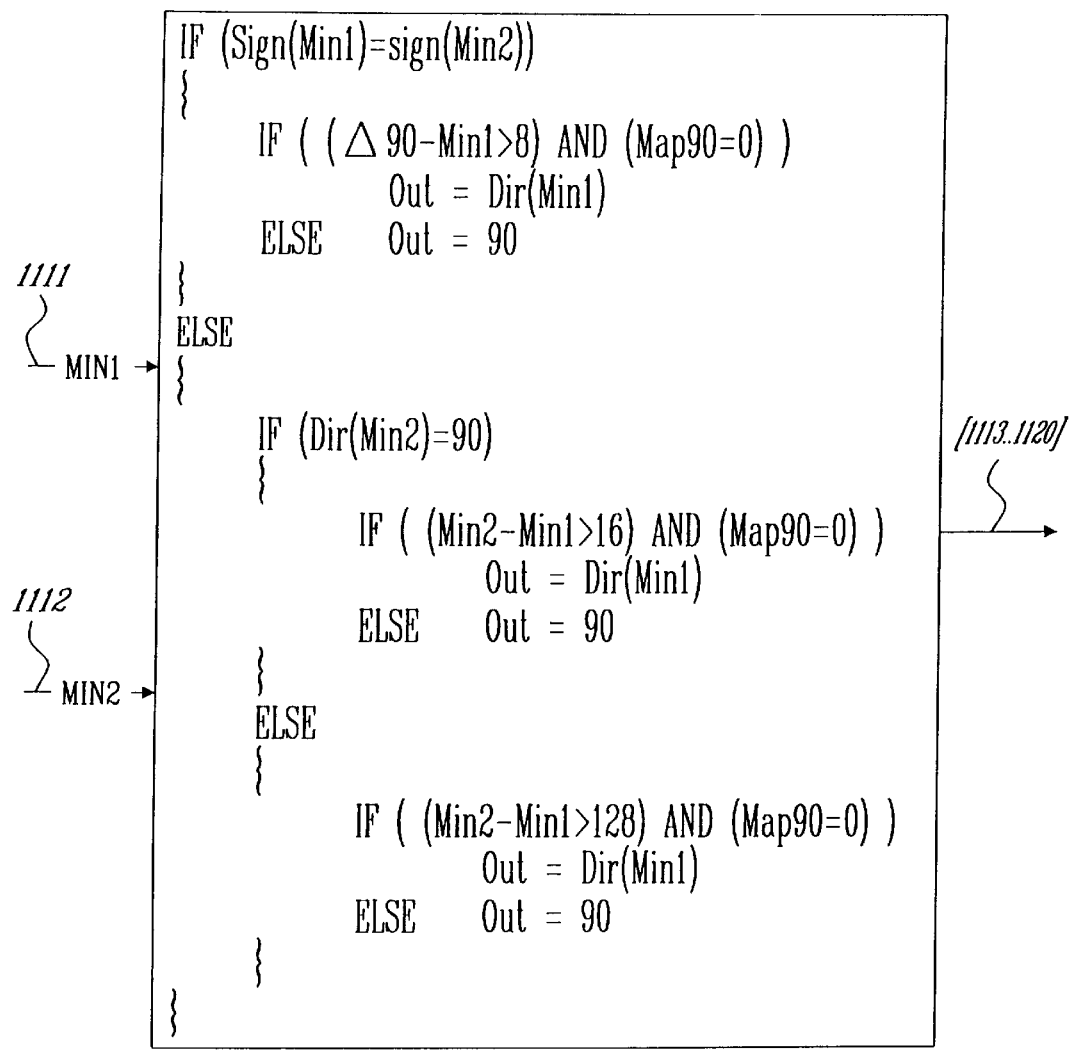
FIG. 13 is the algorithm used for minimization in the edge direction selector according to the preferred embodiment of the invention.

The first signal 226, the second signal 228, and the 90° variation signal 220*a* are applied to a logic device 230, whose pseudo-code is better shown in FIG. 13. The logic device 230 will select only the minimum (the first minimum) direction or the vertical direction. The second minimum is used for a consistent comparison purpose. The logic device 230 provides nine binary outputs 232*a* and 234 through 248 respectively for the nine directions 90°, 45°, 30°, 7°, 4°, −45°, −30°, −7° and −4°. The output of the selected direction is set to "1" while the others are set to "0". Finally, the selected direction can be reset to "0" if the considered pixel is located in an unreliable high frequency region detected by the presence of the high frequency binary signals 190. With the exception of the vertical direction, each of the eight selector outputs is thus validated by a different AND gate 250*a* through 250*h*, with the negation of its respective detected high frequency binary signal. The nine resulting outputs are 232*a* through 232*i*, each representing one of the nine possible directions 90°, 45°, 30°, 7°, 4°, −45°, −30°, −7° and −4°.

In general, the edge direction selector output signals 232[*a–i*] are spiky and comprise many inconsistently isolated directions or discontinuities along a main edge. Consequently, it may be necessary to reinforce the detection results before taking a final decision. The outputs 232[*a–i*] are sent into the edge binary filters 252, as shown in FIG. 2, in order to consolidate the decision to be taken. Except for the vertical direction (90°), the binary signals 232[*b–i*] may further be submitted to four (4) or five (5) consecutive phases of consolidation as better shown in FIGS. 14 and 15. These five phases can be described successively as a horizontal, a directional, a vertical, another horizontal and finally a logical vertical consolidation. The last operation is employed only for nearly horizontal directions, namely 7°, −7°, 4° and −4°. Regarding the first four phases, each one may comprise eight (8) binary filters followed by level decision devices working in parallel. Each filter and its associated decision device may be used for one direction only. The filter masks and the level detectors are given in FIGS. 14, 15, 16 and 17. For example, the impulse response of the first consolidation filter 260 shown in FIG. 4 is (1,1,1,1,1) wherein the central coefficient corresponds to the current pixel position The threshold 262 in the detector 264 is set equal to 2. The consolidation 2, also illustrated in FIGS. 15, 16 and 17 is directional and specific to one considered direction. The consolidations 3 and 4 shown in FIG. 14 have similar structure to that of the first consolidation. The consolidation 5 which is employed for nearly horizontal directions, is composed of four logical filters for four considered directions. Each filter is a linear vertical filter followed by a logical device running the code described by the pseudo code given in FIG. 14, and provides two binary outputs 266 and 268. The outputs 268[*d, e, h, i*] corresponding to the above-mentioned directions and called "Mix", may represent some composite condition in the output image line interpolation.

Referring now to FIG. 18 which represents in pseudo code the final direction decision 270 whose input signals comprise two input vectors 135[*b–i*] and 150[*d, e, h, i*] respectively for directions and mixed conditions. The final direction decision output 54 represents the chosen interpolation direction with or without mixed condition and is sent both to the steered spatio-temporal interpolator 42 and to the vertical motion decision device 272, as illustrated in FIG. 2. For a mixed condition, the interpolator 42 combines the directional and the vertical interpolations into a mean value as described by Eqs. 12–15. Otherwise, the interpolation is strictly directional. Moreover, in the vertical motion device 272, only the direction information carried by the signal 54 may be considered.

Figure 19:
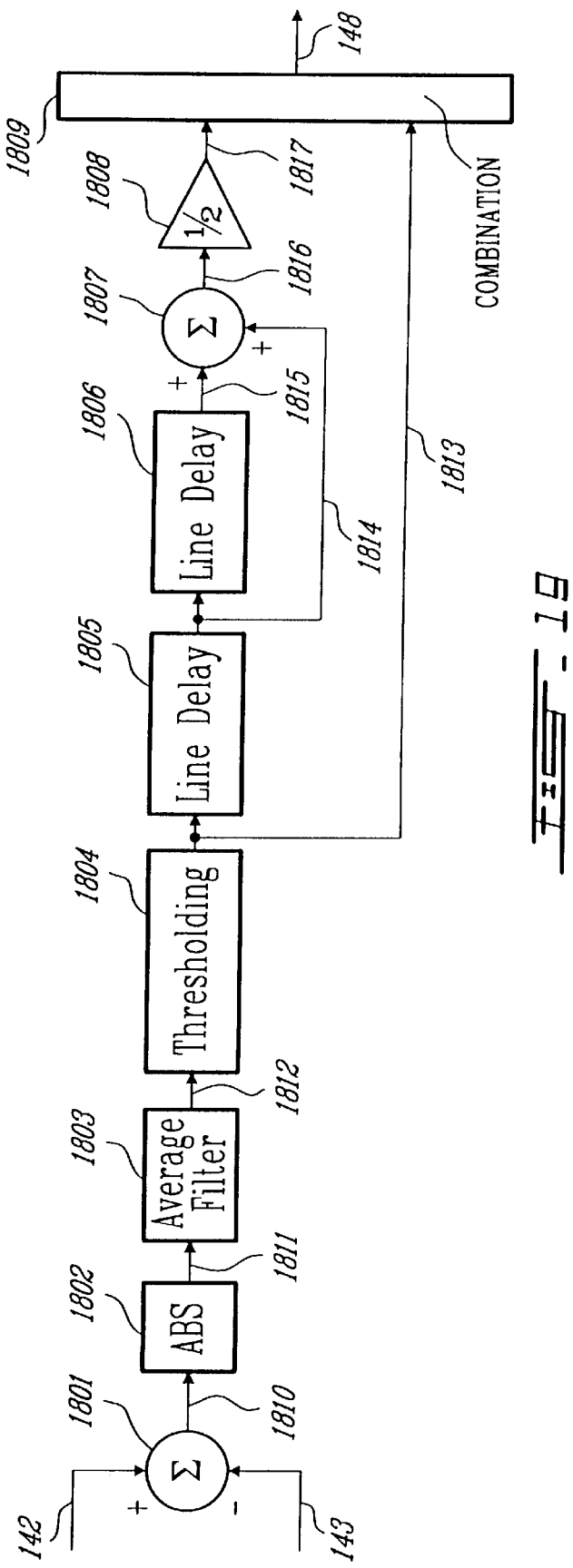
FIG. 19 is a block diagram of the proposed vertical motion detector according to the preferred embodiment of the invention, also shown in FIGS. 2 and 21.
Figure 20:
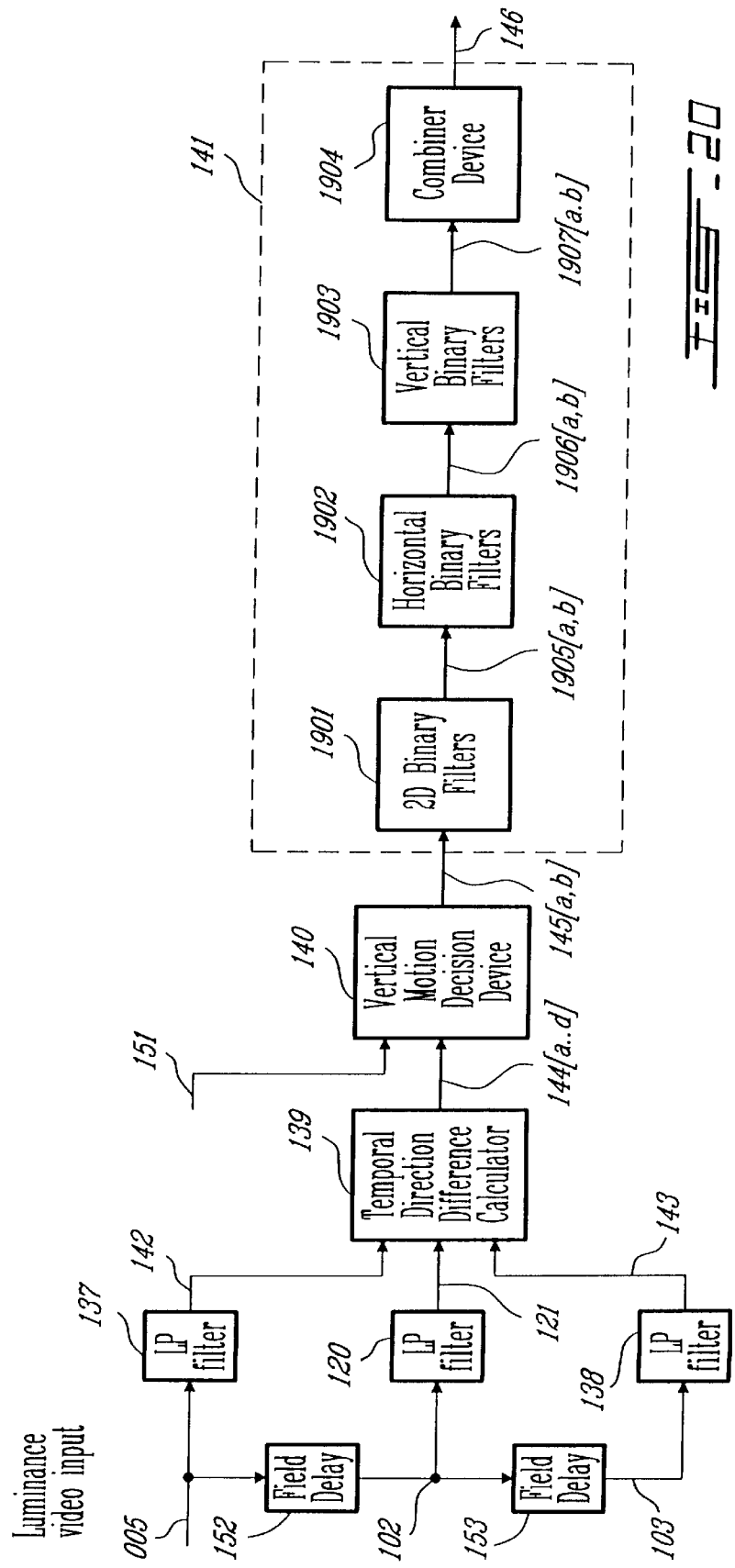
FIG. 20 is a block diagram of a proposed temporal motion detector according to the preferred embodiment of the invention.

Since the vertical motion detector 46 and the temporal detector 48, as illustrated respectively by FIGS. 19 and 20, remain unchanged and have already been described by the same Applicant in U.S. patent application Ser. No. 08/916960 now U.S. Pat. No. 5,936,676 which is herein enclosed by reference, the portion of the preferred embodiment of the invention relating to the above-described devices is completed.

Figure 21:
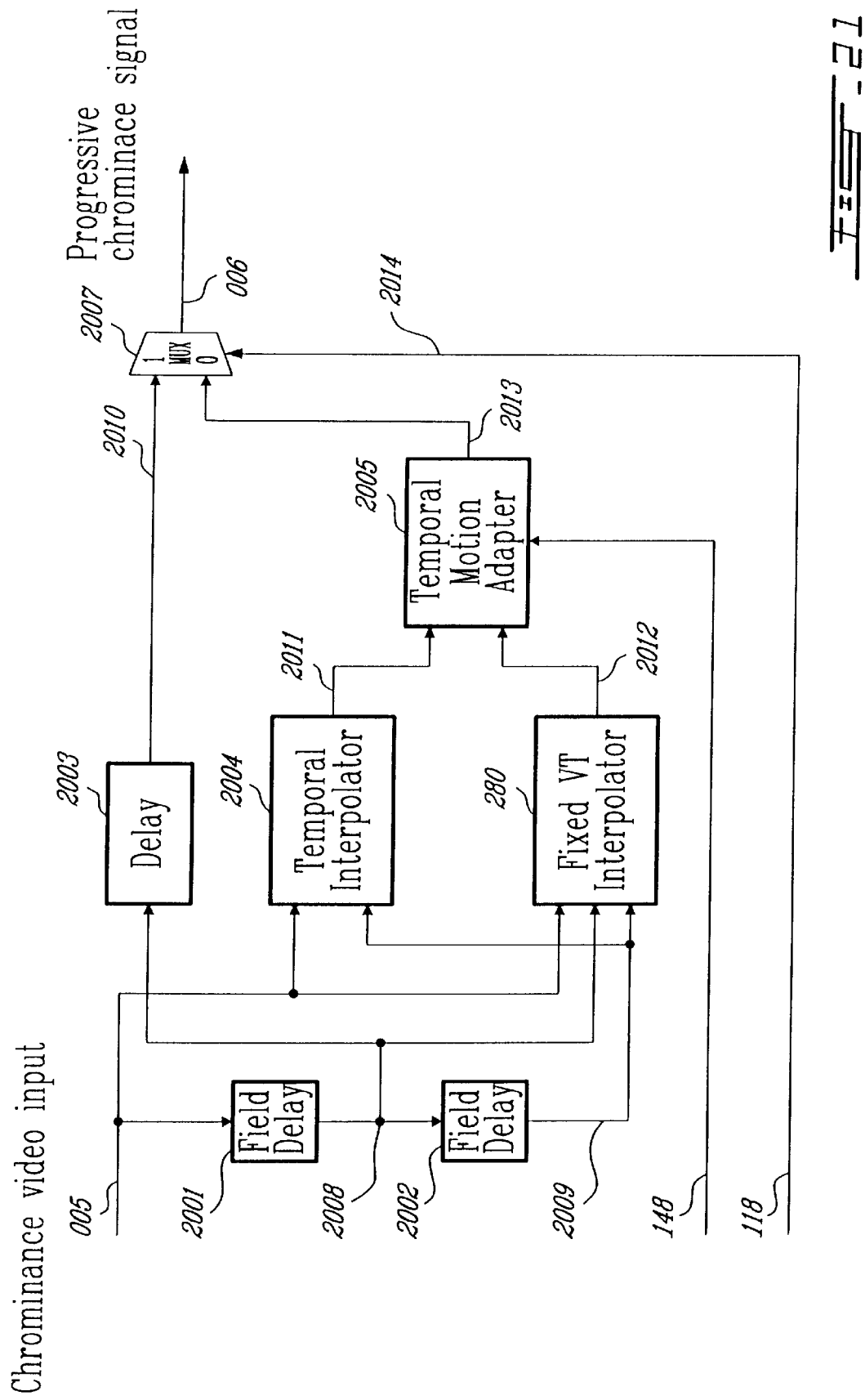
FIG. 21 is a general functional block diagram illustrating a line doubling apparatus or method for chrominance component.

FIG. 21 which illustrates the adaptive line doubling technique for video image chrominance component. Applicants have found that an adaptation based on moving or still parts in a picture is good enough even for nearly horizontal edges. The structure remains unchanged comparatively to the one proposed in the above-mentioned U.S. patent application. The only difference resides in the fixed VT interpolation filter 280, which is now described by Eq. 11.

Figure 22:
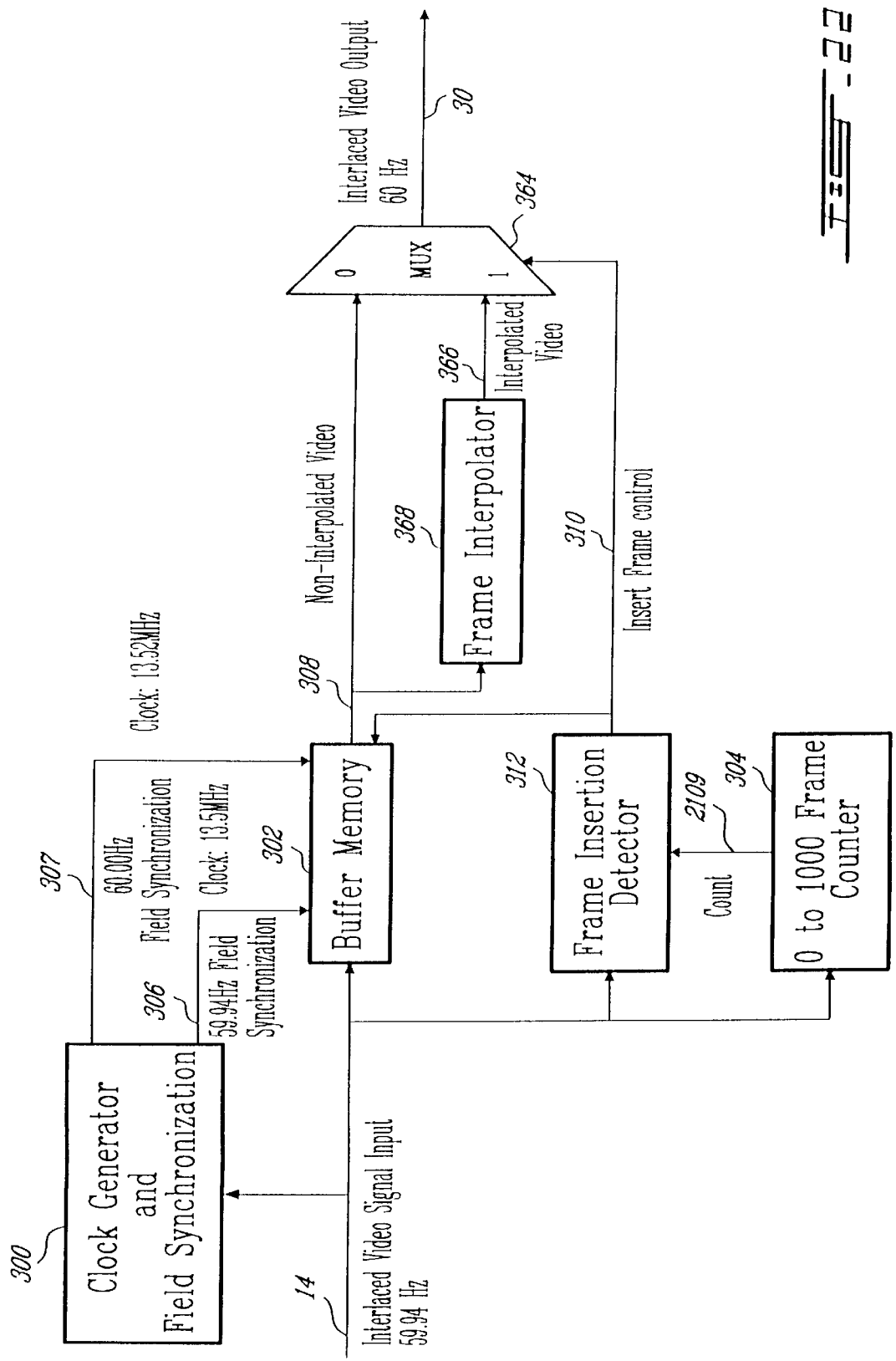
FIG. 22 is a general functional block diagram illustrating the preferred embodiment of the invention referring to the field frequency converter.

FIG. 22 illustrates the preferred embodiment of the invention related to the frame frequency converter or to the field rate converter 12. Even if the following paragraphs describe mainly a frame frequency converter for an standard interlaced video signal, it is to be noted that the same technique may be used for converting the frame frequency of a progressive video signal, still from a lower frame frequency to a higher frame frequency. This particular feature is rarely needed, but is still useful for conversion of standard progressive video signals into HDTV progressive video signals which have higher frame frequency.

In the preferred embodiment of the invention, the frame frequency converter 12 receives the standard interlaced video signal 14 having a field frequency of 59.9400599402 fields/s. This standard video signal 14 is fed simultaneously into the clock and field synchronization generator, into the buffer memory 302, into the frame counter 304 and into the frame insertion detector 312.

The buffer memory means 302 are means that are used for generating an accelerated video signal 308 and may be a FIFO device, which reads the digital video input signal 14 using a 59.94 Hz field synchronization control signal 306, and delivers at its output an accelerated video signal 308 having a field frequency of 60 Hz, using the 60 Hz field synchronization control signal 307. The accelerating means also called the buffer memory means 302 may also accept an insert frame control signal 310 for freezing a frame of video input in order to equilibrate the output video rate. The clock and field synchronization generator 300 provides the control signals 306 and 307 while the frame insertion detector 312 delivers the control signal 310.

The frame counter 304 receives the video signal input 14 and counts from 0 to 1000 the incoming frames. The counter provides a time frame or window in which one new video picture should be inserted in order to get a total of 1001 pictures for each incoming sequence of 1000 pictures. This ratio 1001/1000 is necessary for providing a 60 Hz video output starting from an initial frequency of 59.94 Hz.

Figure 23:
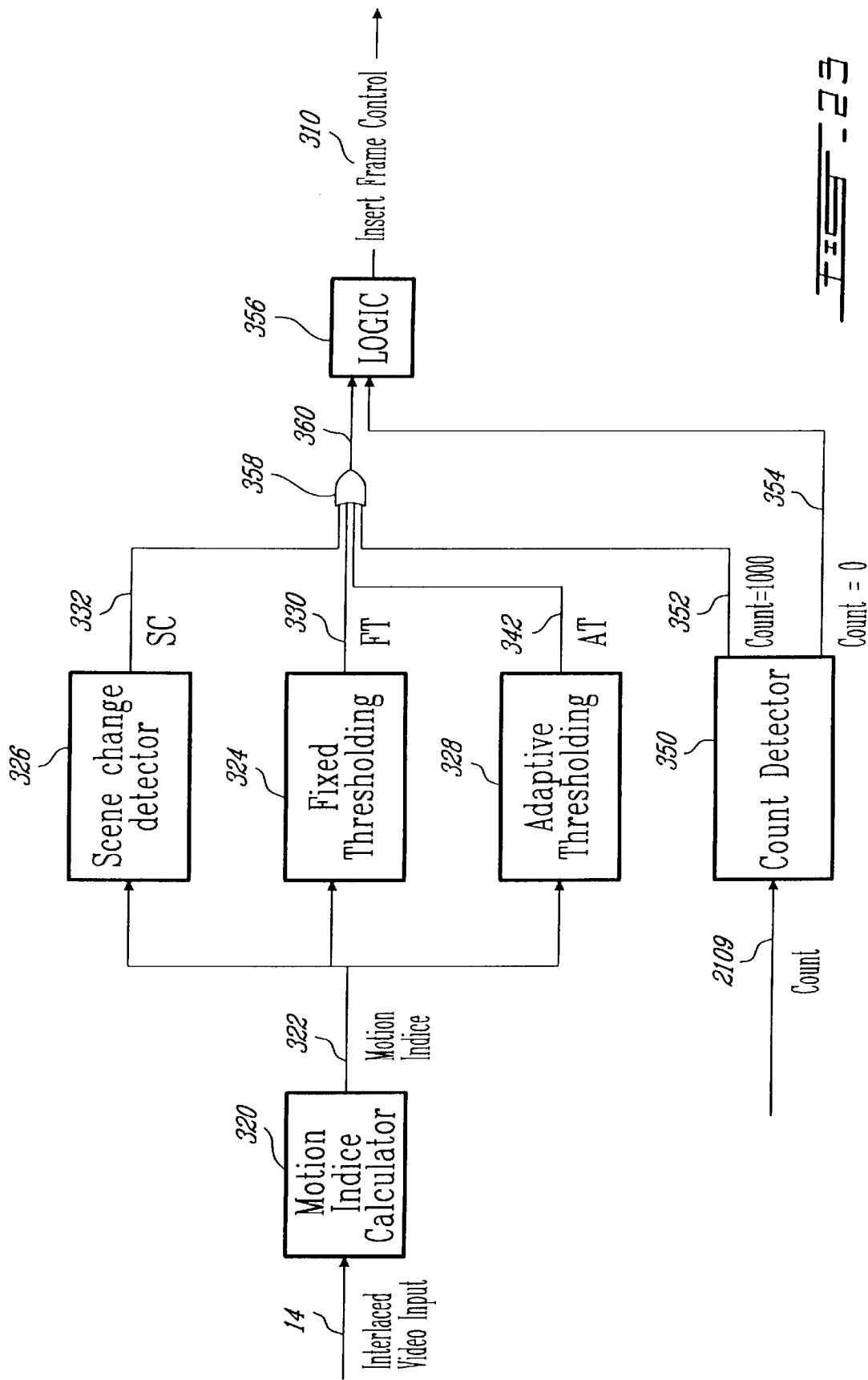
FIG. 23 is a functional block diagram illustrating the proposed detector for the frame inserting condition shown in FIG. 22.

The functional block diagram illustrated in FIG. 23 shows the proposed frame insertion detector 312 for the case of an interlaced video signal. The purpose of the detector is to determine the right moment in a given sequence of 1000 consecutive existing frames to insert a frame. This frame may be duplicate from an existing frame or, preferably, may be a new interpolated frame from adjacent existing frames. In order to reduce visual artifacts that can be created when inserting the new picture, the proposed detector 312 may examine the sequence of frames in order to detect the following situations: a)-static or nearly static picture sequence, b)-sudden scene change, c)-reduced motion activity and d)-end of the time frame. The static situation a) is obvious, since the newly created picture is easy to be interpolated. The scene change situation b) is also understandable, since in such case, picture interpolation artifacts become not evident for the human visual system. The situation c) is a compromise technique in a dynamic picture sequence: an insertion will be made if motion activity is reduced below an adaptive varying threshold. The situation d) is self-explanatory and happens when no other situation has occurred until the counter reaches 1000 frames.

Figure 24:
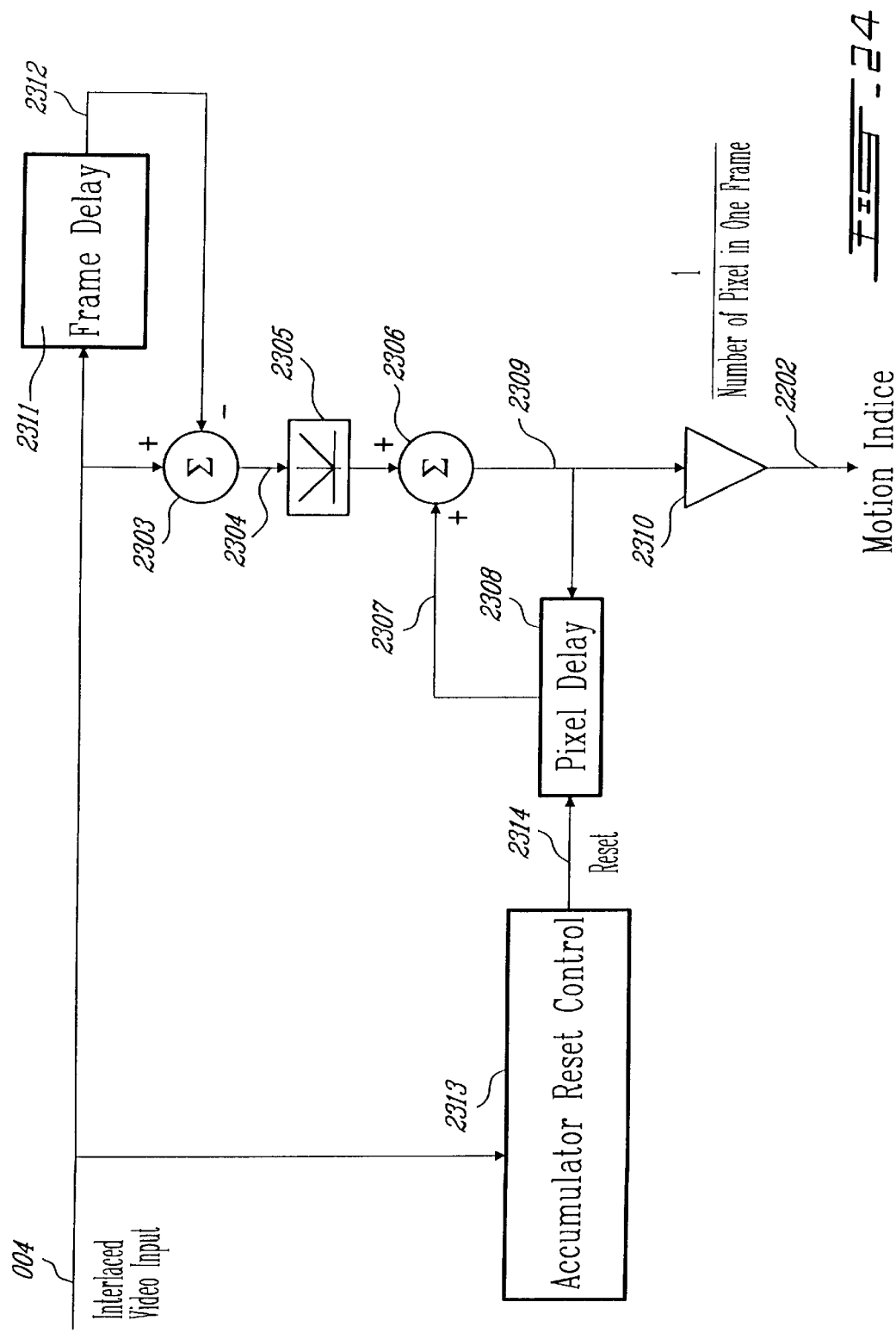
FIG. 24 is the movement indice calculator block diagram for the embodiment shown FIG. 22.
Figure 25:
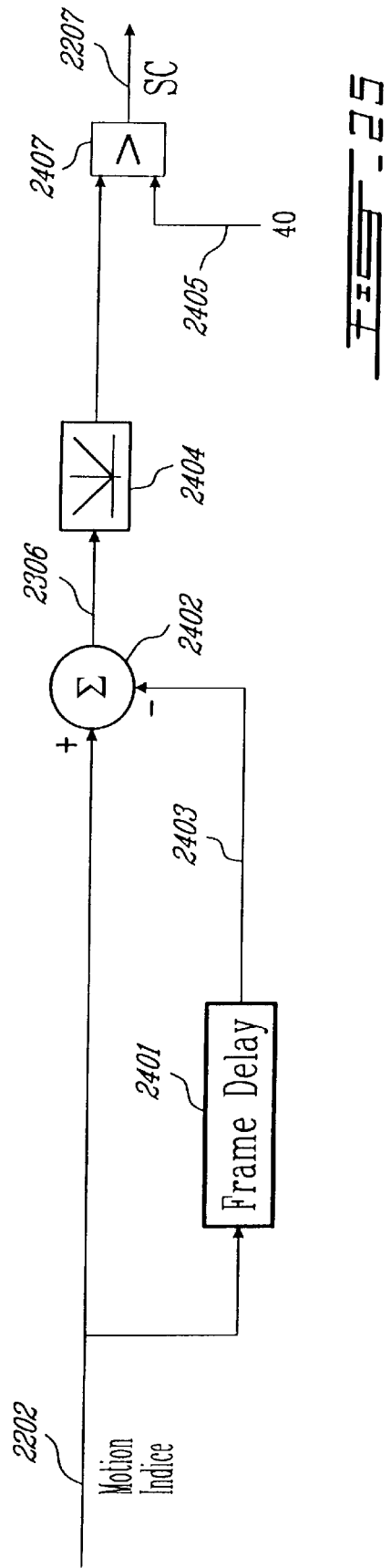
FIG. 25 is a high level flowchart of the scene change detector according to the preferred embodiment of the invention also shown in FIG. 22.
Figure 26:
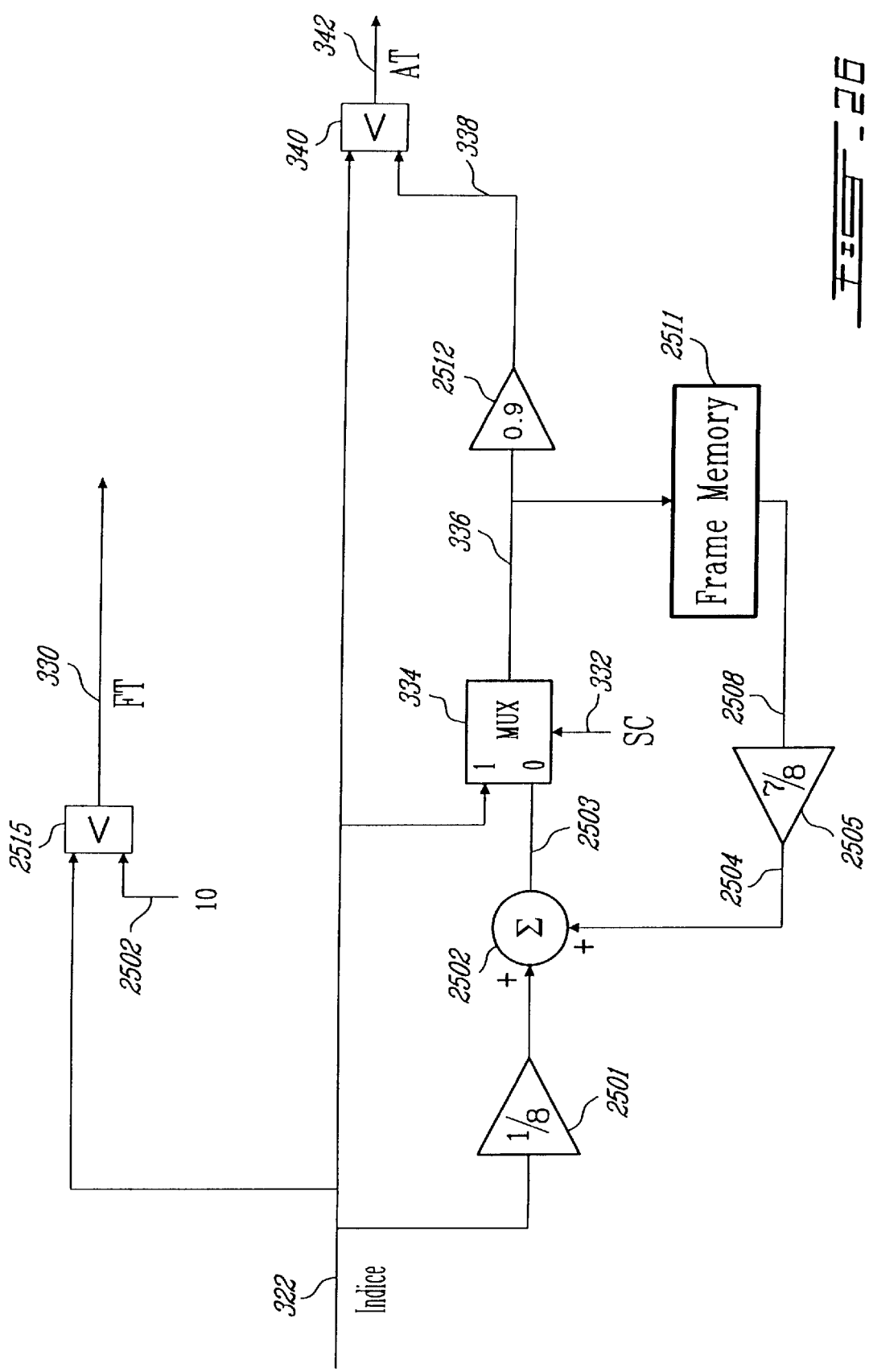
FIG. 26 illustrates fixed and adaptive threshold detectors respectively according to the preferred embodiment of the invention shown in FIG. 21.

The standard interlaced video signal 14 is fed into a motion indice calculator 320, illustrated in details in FIG. 24, which evaluates the average of absolute difference between the frames. This value, herein called the motion activity indice 322, is fed into a fixed thresholding device 324, into a scene change detector 326 and into an adaptive thresholding 328. The fixed thresholding 324 is simply a level detector, as better shown in FIG. 26, which is used for static or nearly static picture detection. It provides an FT output 330 which may be one of the signals meaning that the condition for possible picture insertion has arrived. The scene change detector 326 provides also a binary output 332 when the motion indice difference between two successive frames is larger than a given threshold. The corresponding scene change detector block diagram is illustrated in greater details in FIG. 25. The adaptive thresholding 328, illustrated in detail in FIG. 26, may comprise a first order low-pass filter 334 providing an output 336. The weighted value 338, changed by a possible factor of 0.9 coming from the low-pass filter output 336 is used as an adaptive varying threshold for the detector 340. If the instantaneous frame motion activity indice is smaller than the threshold signal 338, the detector AT output will be "ON" giving the signal for a possible picture insertion moment.

The multiplexer 334's function is to quickly change the varying threshold when a sudden scene change is detected. Referring back to FIG. 23, the frame count detector 350 provides a binary signal 352 that comprise a Count=1000 signal, for picture insertion time limit. The frame counter detector 350 also provides a Count=0 signal, 354, for the beginning of a time interval. This signal is sent to a logic device 356. Meanwhile, the four binary signals, 332, 330, 342 and 352 are fed into an OR gate 358 in order to provide an output signal 360 designating a possible picture insertion signal. This signal 360 is also sent into the logic device 356 in order to further provide the insert frame control signal 310, which will have a value "ON" only once during the 1000 frames time window. In fact, the frame insertion detector 312 only realizes the first event that occurs among the four possibilities: FT, SC, AT and Count=1000. The frame control signal 310 is transmitted into buffer memory 302 for freezing condition and also to the multiplexer 364 for selecting the new interpolated picture 366 from frame interpolator 368.

Figure 27:
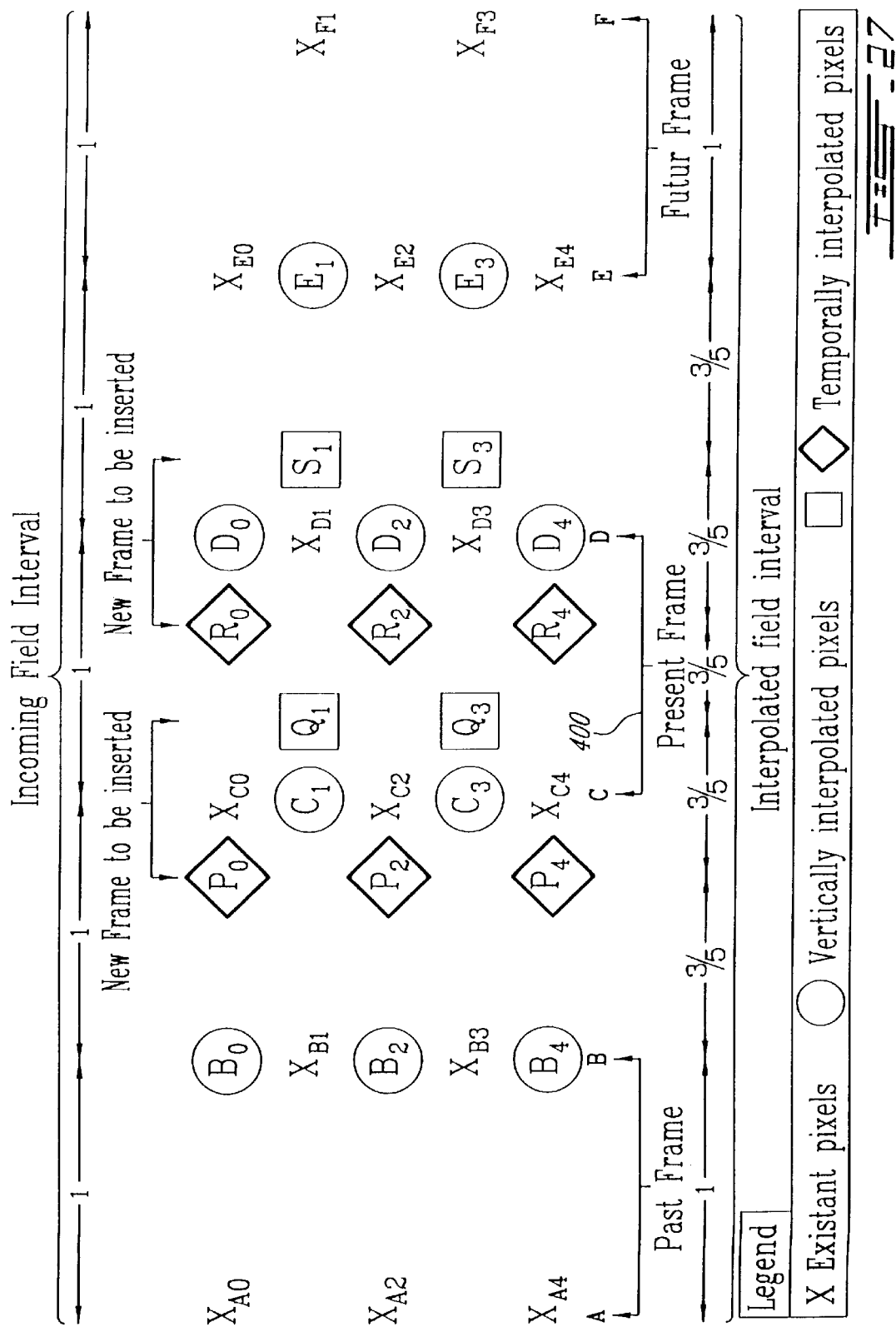
FIG. 27 represents the proposed technique for frame interpolation and frame insertion according to the preferred embodiment of the invention, also shown in FIG. 21.

FIG. 27 illustrates the proposed technique for the frame interpolator module 368 and for the insertion means or frame insertion module 364. In order to reduce the motion discontinuity artifact which occurs when introducing a new, even interpolated picture, the proposed frame insertion technique is performed according to the preferred embodiment of the invention by substituting one incoming frame by two new and interpolated frames (substituting two incoming fields with four new and interpolated fields, for the interlaced case), when the inserting condition is detected. FIG. 27 also illustrates successively in time the various field positions. The present frame 400 composed of the two fields C and D is to be deleted. The two new frames composed, the first one being composed of the fields P and Q and the second one of the fields R and S, are to be inserted. The time distance between the previous fields B and the interpolated field P, may be, according to the best mode of the invention, $\tfrac{3}{5}$ of the incoming field interval. The normalized distance between P and C is thus $\tfrac{2}{5}$. For simplicity purpose, the proposed interpolation technique for the field P is based only on its two nearest existing fields, B and C. Similarly, it should be the fields C and D that are used for the calculation of the interpolated field Q, and so on.

New field interpolation may be performed in two separate steps: a) the vertical interpolation for the missing lines in the existent fields and b) the temporal interpolation for the new fields to be inserted. FIG. 28 illustrates these separate interpolation filters. The reader is invited to take note that the pixel and the line notations are described in FIG. 27. The vertical interpolation for the missing lines is provided from a half-band filter whose impulse response is described by the following: (−8,0,40,64,40,0,−8)/64. The temporal filter for new field interpolation is a two taps filter in which the coefficients ¾ and ¼ are used and represent practical fixed-point values, approximately equal to the ⅗ and the ⅖ above mentioned normalized field distances. The coefficient ¾ is associated with the nearest existent field for the considered interpolated field. The coefficient ¼ is associated with the other existent field employed for the interpolation. For example, $P_2$ may be described by the following expression:

$$P_2 = (\tfrac{3}{4})C_{C2} + (\tfrac{1}{4})B_2$$

Referring back to FIG. 22, the interpolated video pictures 366 may be selected by the insert frame control signal 310 and by the multiplexer 364 in order to provide the output, a 60 Hz interlaced video signal 16.

What we claim is:

1. A video frame frequency converter for converting a standard video signal having a first frame frequency into an intermediate video signal having a higher second frame frequency, said video frame frequency converter comprising:
    a converter input for receiving said standard video signal;
    a frame insertion detector means for analyzing motion activity of a sequence of existing frames of said standard video signal and for detecting a best moment for adding at least one frame in said sequence of existing frames;
    means for generating an accelerated video signal from said standard video signal, said accelerated video signal having said higher second frame frequency;
    insertion means for inserting at least one frame into said sequence of existing frames of said accelerated video signal for increasing a number of frames of said sequence having a predetermined duration, said insertion means outputting said intermediate video signal having said higher frame frequency; and
    a converter output for providing said intermediate video signal.

2. A video frame frequency converter as claimed in claim 1, further comprising frame interpolator means for creating at least one new interpolated frame by interpolation of existing temporally adjacent frames, said at least one new interpolated frame being used by said insertion means for inserting into said sequence of existing frames for increasing said first frame frequency to said higher second frequency.

3. A video frame frequency converter as claimed in claim 2, wherein said interpolation is also performed spatially and comprises interpolating vertically adjacent pixels before temporally interpolating adjacent frames for creating said new interpolated frame.

4. The video frame frequency converter as claimed in claim 2, further comprising:
    a clock generator and frame synchronization means for providing a first synchronization signal having a frequency corresponding to said standard video signal and a second synchronization signal having a frequency corresponding to said intermediate video signal;
    a frame counter means for counting frames from 1 to a number of frames comprised in said sequence of existing frames and for providing an end-of-sequence signal to said frame insertion detector means when an end-of-sequence count occurs; and
    wherein said generating means comprises a buffer memory means for storing said existing video frames of said standard video signal, said buffer memory means directly receiving said standard video signal from said input at a rate corresponding to said first synchronization signal also received by said buffer memory means from said clock generator and field synchronization means, said buffer memory means outputting an accelerated video signal consisting of said standard video signal having said higher second frequency at a buffer memory output according to said second synchronization signal also received by said buffer memory means, said buffer memory means also receiving an insert frame control signal from said frame insertion detector means for controlling said buffer memory output.

5. The video frame frequency converter as claimed in claim 4, wherein upon control of said insert frame control signal provided by said frame insertion detector means, said buffer memory means either continuously outputs said accelerated video signal at a rate corresponding to said second higher frequency or stops outputting said accelerated video signal, whereby when a best moment for adding a new interpolated frame occurs, said insert frame control signal make said buffer memory means to skip outputting frames.

6. The video frame frequency converter as claimed in claim 5, wherein:
    said frame insertion means is a multiplexer having two inputs and one output, a first input receiving said accelerated video signal output by said buffer memory means according to said second synchronization signal, and said second input receiving said new interpolated frames from said frame interpolator means, wherein upon control of said insert frame control signal provided by said frame insertion means said multiplexer outputs one of said accelerated video signal received at said first input and said interpolated frames received at said second input, whereby said new interpolated frames added to said sequence of existing frames increase the frame frequency of the signal.

7. The video frame frequency converter as claimed in claim 6, wherein upon control of said insert frame control signal, said buffer memory means stops outputting said existing frames for a given time interval so that at least one existing frame is skipped and during said time interval, upon control of same said insert frame control signal said multiplexer accepts a number of new interpolated frames higher than a number of skipped frames from said frame interpolator means and outputs said new interpolated frames instead of said existing frames, thus adding frames to said sequence of existing frames.

8. The video frame frequency converter as claimed in claim 7, wherein:
    said standard video signal is a standard interlaced video signal;
    said first frame frequency of said standard interlaced video signal is approximately 59.94 fields per second;
    said intermediate video signal is an interlaced intermediate video signal;
    said higher second frame frequency of said interlaced intermediate video signal is approximately 60.00 Hz; and said sequence of existing frames comprises 1000 video frames, and for increasing said first frame frequency one new interpolated frame is added to each said sequence of 1000 existing frames.

9. The video frame frequency converter as claimed in claim 8, wherein said time interval is equivalent to a duration of one frame, said buffer memory means stops outputting existing frames for said duration of one frame thus skipping one existing frame from said sequence of existing frames and said multiplexer accepts two new interpolated frames in place of said one existing frame, during said time interval.

10. The video frame frequency converter as claimed in claim 9, wherein said existing frame comprises two existing video fields, said new interpolated frames each comprise two interpolated video fields.

11. The video frame frequency converter as claimed in claim 10, wherein each of said two interpolated fields are computed pixel by pixel, for each interpolated pixel using information comprised in at least two vertically adjacent existing pixels.

12. The video frame frequency converter as claimed in claim 11, wherein said frame insertion detector means comprises:
   a motion indice calculator for calculating a video image motion indice representing a motion level of a sequence of video frames;
   a scene change detector for providing a first insert frame control signal when sudden changes occur in said sequence of video frames, said sudden changes representing scene changes, said scene change detector directly receiving said motion indice at its input;
   a fixed thresholding for providing a second insert frame control signal when slow changes or no changes are indicated by said motion indice received at its input;
   an adaptive thresholding for providing a third insert frame control signal when a drop in a video sequence motion rate is detected, wherein said adaptive thresholding computes an average motion indice using a sequence of previous video frames wherein a motion rate is constant or almost constant and compares said average motion indice to said motion indice received from said motion indice calculator, said third insert frame control signal being output when said average motion indice is lower than said motion indice received from said motion indice calculator;
   a count detector for counting frames in a sequence of 1000 frames and providing a fourth insert frame signal when a count of 1000 is reached;
   a logical OR gate for outputting an intermediate insert frame signal when at least one of said first, second, third and fourth insert frame signal is output; and
   a logic device receiving an output from said logical OR gate and a count=0 signal from said count detector, wherein said count=0 signal is used for resetting said logic device so that it outputs an insert frame signal only once per sequence of 1000 frames.

13. A method for converting a standard video signal having a first frame frequency into an intermediate video signal having a higher second frame frequency, said method comprising the steps of:
   accelerating said standard video signal from said lower frame frequency to said higher frame frequency thus producing an accelerated video signal;
   analyzing motion activity of a sequence of existing frames of said standard video signal for detecting a best moment for adding at least one frame into said sequence of existing frames, and for producing an insert frame control signal; and
   upon control of said insert frame control signal, adding said at least one frame in said sequence of existing frames, thus producing said intermediate video signal.

14. A method of video frame frequency conversion as claimed in claim 13, further comprising the step of:
   creating at least one new interpolated frame by computing new frame pixels by interpolation of temporally and spatially adjacent pixels, respectively being comprised in temporally adjacent frames and in a current frame.

15. A method of video frame frequency conversion as claimed in claim 13, wherein the step of adding at least one frame comprises the steps of:
   upon control of said insert frame control signal, skipping at least one frame from said accelerated signal; and
   upon control of said insert frame control signal, inserting in place of said at least one skipped frame at least two frames for increasing a number of frames in said sequence.

16. A method of video frame frequency conversion as claimed in claim 14, further comprising the steps of:
   upon control of said insert frame control signal, skipping at least one frame from said accelerated signal; and
   upon control of said insert frame control signal, inserting in place of said at least one skipped frame at least two frames for increasing a number of frames in said sequence.

17. A video frame frequency converter for converting a standard interlaced video signal having a first frame frequency into an intermediate interlaced video signal having a higher second frame frequency, said video frame frequency converter comprising:
   a converter input for receiving said standard interlaced video signal;
   a frame insertion detector means for analyzing motion activity of a sequence of existing frames of said standard video signal and for detecting a best moment for adding at least one new frame in said sequence of existing frames, said frame insertion detector means producing an insert frame control signal when said best moment is detected;
   means for generating an accelerated interlaced video signal from said standard interlaced video signal, said accelerated video signal having said higher second frame frequency;
   frame interpolator means for creating at least two new interpolated fields by interpolation of existing adjacent fields of said standard interlaced video signal; and
   insertion means for inserting said at least two new interpolated fields into said sequence of existing frames and outputting said sequence of frames including said interpolated fields at said higher second frequency as said intermediate interlaced video signal.

18. A video frame frequency converter as claimed in claim 17, wherein said interpolation is temporal and spatial, said frame interpolation means performing
   using information collected from at least one spatially interpolated temporally adjacent field of an new interpolated field for creating said interpolated field pixel by pixel.

19. The video frame frequency converter as claimed in claim 18, further comprising:
   a clock generator and field synchronization means for providing a first synchronization signal having a frequency corresponding to said standard interlaced video signal and a second synchronization signal having a frequency corresponding to said intermediate interlaced video signal; and a buffer memory means for storing said existing video frames of said standard interlaced video signal, said buffer memory means directly receiving said standard interlaced video signal from said input at a rate corresponding to said first synchronization signal also received by said buffer memory means from said clock generator and field synchronization means, said buffer memory means outputting an accelerated interlaced video signal consisting of said standard interlaced video signal having said higher second frequency at a buffer memory output according to said second synchronization signal also received by said buffer memory means.

20. The video frame frequency converter as claimed in claim 19, wherein said frame insertion means is a multiplexer having two inputs and one output, a first input receiving said accelerated interlaced video signal output by said buffer memory means according to said second synchronization signal, and said second input receiving said new interpolated frames from said frame interpolator means, wherein said multiplexer outputs one of said accelerated interlaced video signal received at said first input and said interpolated frames received at said second input, whereby said new interpolated frames added to said sequence of existing frames increase the frame frequency of the signal.

21. The video frame frequency converter as claimed in claim 20, wherein:

said first frame frequency of said standard interlaced interlaced video signal is approximately 59.94 fields per second;

said intermediate interlaced video signal has said higher second frame frequency of approximately 60.00 Hz; and said sequence of existing frames comprises 1000 video frames, and for increasing said first frame frequency one new interpolated frame is added to each said sequence of 1000 existing frames.

22. The video frame frequency converter as claimed in claim 21, wherein said buffer memory means stops outputting existing frames for a duration of one frame, thus skipping one existing frame from said sequence of existing frames and said multiplexer accepts two new interpolated frames in place of said one existing frame, during said sequence of existing frames.

23. The video frame frequency converter as claimed in claim 22, wherein said each of said existing frames comprises two existing video fields, said new interpolated frames each comprising two interpolated video fields.

24. The video frame frequency converter as claimed in claim 23, wherein each one of said two interpolated fields are computed pixel by pixel, for each interpolated pixel using information comprised in at least two vertically adjacent existing pixels.

25. An edge direction detector to be used in a video de-interlacer for detecting at least one best direction from a set of pre-defined directions for producing a spatial direction control signal used for performing a spatio-temporal interpolation in said best direction, said edge direction detector comprising:

directional interpolator means for performing an interpolation for each one of said pre-defined directions using a past, a present and a future video field signal received at its input, said directional interpolator means outputting an interpolated signal comprising interpolated signals, for each pixel, for each of said pre-defined directions; and edge direction selector means for selecting said at least one best direction for interpolating using said interpolated signal received from said directional interpolator means.

26. The edge direction detector as claimed in claim 25, wherein said past, present and future video field signals are luminance video signals and said edge direction detector further comprises:

edge direction calculator and filtering means for removing noise and strengthening a horizontal edge of said interpolated video signals, said edge direction calculator and filtering means receiving said interpolated signals at its input and outputting corrected interpolated signals to said edge direction selector means;

horizontal and vertical high frequency detector means for detecting high frequency regions in said interpolated signals, said horizontal and vertical high frequency detector means receiving at its input said interpolated signals and outputting to said edge direction selector means a high frequency information signal representing said high frequency regions for each one of said pre-defined directions, whereby said high frequency regions are possible causes of errors in an edge direction estimation process;

edge binary filter means for filtering and reinforcing a result output by said edge direction selector means; and direction decision means for selecting one best direction to be used for interpolation.

27. The edge direction detector as claimed in claim 25, wherein said pre-defined directions used for interpolating said video field signals form angles of approximately $\pm 4°$, $\pm 7°$, $\pm 30°$, $\pm 45°$ and $+90°$ in a floating reference system having its origin located at a pixel to be interpolated and having a first axis oriented horizontally.

28. The edge direction detector as claimed in claim 25, wherein said directional interpolator means outputs said interpolated signals defined by the following equations:

$SST-4°=(4A_{-8}+4A'_{8}+2B_0+2C_0-D_{-16}-D'_{16}-E_{-16}-E'_{16})/8$
$SST+4°=(4A_{8}+4A'_{-8}+2B_0+2C_0-D_{16}-D'_{-16}-E_{16}-E'_{-16})/8$
$SST-7°=(4A_{-4}+4A'_{4}+2B_0+2C_0-D_{-8}-D'_{8}-E_{-8}-E'_{8})/8$
$SST+7°=(4A_{4}+4A'_{-4}+2B_0+2C_0-D_{8}-D'_{-8}-E_{8}-E'_{-8})/8$
$SST-30°=(4A_{-2}+4A'_{2}+2B_0+2C_0-D_{-4}-D'_{4}-E_{-4}-E'_{4})/8$
$SST+30°=(4A_{2}+4A'_{-2}+2B_0+2C_0-D_{4}-D'_{-4}-E_{4}-E'_{-4})/8$
$SST-45°=(4A_{-1}+4A'_{1}+2B_0+2C_0-D_{-2}-D'_{2}-E_{-2}-E'_{2})/8$
$SST+45°=(4A_{1}+4A'_{-1}+2B_0+2C_0-D_{2}-D'_{-2}-E_{2}-E'_{-2})/8$
$SST90°=(18A_0+18A'_0-2F_0-2F'_0+4B_0+4C_0-3D_0-3D'_0-3E_0-3E'_0+H_0+H'_0+G_0+G'_0)/32$ wherein SST is a first interpolated luminance signal associated with each of said directions;

$A_{\pm i}$ is a value of a pixel $\pm i$, in said reference system having its origin being located at said pixel to be interpolated, of a present field line containing said pixel to be interpolated;

$A'_{\pm i}$ is a value of a pixel $\pm i$, in said reference system, of a present existing field line adjacent to the pixel to be interpolated;

$B_0$ is a next field pixel value spatially corresponding to said pixel to be interpolated;

$C_0$ is a previous field pixel value spatially corresponding to said pixel to be interpolated; $D_{\pm i}$ is a value of a pixel ±i, in the reference system having its origin being located at a next field pixel spatially corresponding to the pixel to be interpolated, of a next field existing previous line adjacent a next field line containing the next field pixel;

$D'_{\pm i}$ is a value of a pixel ±i, in the reference system having its origin being located at the next field pixel, of a next field existing next line adjacent the next field line;

$E_{\pm i}$ is a value of a pixel ±i, in the reference system having its origin being located at a previous field pixel spatially corresponding to the pixel to be interpolated, of a previous field existing previous line adjacent a previous field line containing the previous field pixel;

$E'_{\pm i}$ is a value of a pixel ±i, in the reference system having its origin being located at the previous field, of a previous field existing next line adjacent the previous field line;

$F_0$ is a value of a present field existing pixel adjacent to the pixel $A_0$ in the direction +90°;

$F'_0$ is a value of a present field existing pixel adjacent a pixel corresponding to $A'_0$ in the direction +90°;

$G_0$ is the value of a future field existing pixel adjacent to $D_0$ in the direction +90°;

$G'_0$ is the value of a future field existing pixel adjacent to $D'_0$ in the direction −90°;

$H_0$ is the value of a past field existing pixel adjacent to $E_0$ in the direction +90°; and $H'_0$ is the value of a future field existing pixel adjacent to $E'_0$ in the direction −90°.

29. An up-converter apparatus for converting a standard interlaced video signal into a progressive HDTV video signal, said up-converter apparatus comprising:

a video frame frequency converter for converting said standard interlaced video signal having a first frame frequency into an intermediate interlaced video signal having a higher second frame frequency, said video frame frequency converter comprising a converter input for receiving said standard interlaced video signal; means for generating an accelerated interlaced video signal from said standard interlaced video signal, said accelerated video signal having said higher second frame frequency; frame interpolator means for creating at least two new interpolated fields by interpolation of existing adjacent fields of said standard interlaced video signal; insertion means for inserting said at least two new interpolated fields into a sequence of existing frames and outputting said sequence of frames including said interpolated fields at said higher second frequency as said intermediate interlaced video signal; and a frame insertion detector means for analyzing motion activity of said sequence of existing frames of said standard video signal and for detecting a best moment for adding at least one new frame in said sequence of existing frames of said standard video signal, said frame insertion detector means producing an insert frame control signal when said best moment is detected; and an edge direction detector to be used in a video de-interlacer receiving at an input said intermediate interlaced video signal for detecting at least one best direction from a set of pre-defined directions for producing a spatial direction control signal used for performing a spatio-temporal interpolation in said best direction, said edge direction detector comprising directional interpolator means for performing an interpolation for each one of said pre-defined directions using a past, a present and a future video field signal received at its input, said directional interpolator means outputting an interpolated signal comprising interpolated signals, for each pixel, for each of said pre-defined directions; and edge direction selector means for selecting said at least one best direction for interpolating using said interpolated signal received from said directional interpolator means.

30. The up-converter apparatus as claimed in claim 29, wherein said past, present and future video field signals are luminance video signals and said edge direction detector further comprises:

edge direction calculator and filtering means for removing noise and strengthening a horizontal edge of said interpolated video signals, said edge direction calculator and filtering means receiving said interpolated signals at its input and outputting corrected interpolated signals to said edge direction selector means;

horizontal and vertical high frequency detector means for detecting high frequency regions in said interpolated signals, said horizontal and vertical high frequency detector means receiving at its input said interpolated signals and outputting to said edge direction selector means a high frequency information signal representing said high frequency regions for each one of said pre-defined directions, whereby said high frequency regions are possible causes of errors in an edge direction estimation process;

edge binary filter means for filtering and reinforcing a result output by said edge direction selector means; and direction decision means for selecting one best direction to be used for interpolation.

31. The up-converter apparatus as claimed in claim 30, wherein said pre-defined directions used for interpolating said video field signals form angles of approximately ±4°, ±7°, ±30°, ±45° and ±90° in a floating reference system having its origin located at a pixel to be interpolated and having a first axis oriented horizontally, and said directional interpolator means outputs said interpolated signals defined by the following equations:

$SST-4° = (4A_{-8} + 4A'_8 + 2B_0 + 2C_0 - D_{-16} - D'_{16} - E_{-16} - E'_{16})/8$
$SST+4° = (4A_8 + 4A'_{-8} + 2B_0 + 2C_0 - D_{16} - D'_{-16} - E_{16} - E'_{-16})/8$
$SST-7° = (4A_{-4} + 4A'_4 + 2B_0 + 2C_0 - D_{-8} - D'_8 - E_{-8} - E'_8)/8$
$SST+7° = (4A_4 + 4A'_{-4} + 2B_0 + 2C_0 - D_8 - D'_{-8} - E_8 - E'_{-8})/8$
$SST-30° = (4A_{-2} + 4A'_2 + 2B_0 + 2C_0 - D_{-4} - D'_4 - E_{-4} - E'_4)/8$
$SST+30° = (4A_2 + 4A'_{-2} + 2B_0 + 2C_0 - D_4 - D'_{-4} - E_4 - E'_{-4})/8$
$SST-45° = (4A_{-1} + 4A'_1 + 2B_0 + 2C_0 - D_{-2} - D'_2 - E_{-2} - E'_2)/8$
$SST+45° = (4A_1 + 4A'_{-1} + 2B_0 + 2C_0 - D_2 - D'_{-2} - E_2 - E'_{-2})/8$
$SST90° = (18A_0 + 18A'_0 - 2F_0 - 2F'_0 + 4B_0 + 4C_0 - 3D_0 - 3D'_0 - 3E_0 - 3E'_0 + H_0 + H'_0 + G_0 + G'_0)/32$ wherein SST is a first interpolated luminance signal associated with each of said directions;

$A_{\pm i}$ is a value of a pixel ±i, in said reference system having its origin being located at said pixel to be interpolated, of a present field line containing said pixel to be interpolated;

$A'_{\pm i}$ is a value of a pixel ±i, in said reference system, of a present existing field line adjacent to the pixel to be interpolated;

$B_0$ is a next field pixel value spatially corresponding to said pixel to be interpolated;

$C_0$ is a previous field pixel value spatially corresponding to said pixel to be interpolated; $D_{\pm i}$ is a value of a pixel ±i, in the reference system having its origin being located at a next field pixel spatially corresponding to the pixel to be interpolated, of a next field existing previous line adjacent a next field line containing the next field pixel;

$D'_{\pm i}$ is a value of a pixel ±i, in the reference system having its origin being located at the next field pixel, of a next field existing next line adjacent the next field line;

$E_{\pm i}$ is a value of a pixel ±i, in the reference system having its origin being located at a previous field pixel spatially corresponding to the pixel to be interpolated, of a previous field existing previous line adjacent a previous field line containing the previous field pixel;

$E'_{\pm i}$ is a value of a pixel ±i, in the reference system having its origin being located at the previous field, of a previous field existing next line adjacent the previous field line;

$F_0$ is a value of a present field existing pixel adjacent to the pixel $A_0$ in the direction ±90°;

$F'_0$ is a value of a present field existing pixel adjacent a pixel corresponding to $A'_0$ in the direction +90°;

$G_0$ is the value of a future field existing pixel adjacent to $D_0$ in the direction +90°;

$G'_0$ is the value of a future field existing pixel adjacent to $D'_0$ in the direction −90°;

$H_0$ is the value of a past field existing pixel adjacent to $E_0$ in the direction +90°; and $H'_0$ is the value of a future field existing pixel adjacent to $E'_0$ in the direction −90°.

* * * * *